United States Patent
Kane et al.

[11] Patent Number: 5,971,614
[45] Date of Patent: Oct. 26, 1999

[54] MODULAR HYDROSTATIC BEARING WITH CARRIAGE FORM-FIT TO PR

[75] Inventors: Nathan R. Kane, Austin, Tex.; Alexander H. Slocum, Bow, N.H.

[73] Assignee: Aesop, Inc., Concord, N.H.

[21] Appl. No.: 08/925,399

[22] Filed: Sep. 8, 1997

[51] Int. Cl.⁶ .................................................. F16C 29/00
[52] U.S. Cl. ............................................................ 384/12
[58] Field of Search ................................ 384/12, 13, 14, 384/42, 38

[56] References Cited

U.S. PATENT DOCUMENTS

| | | | |
|---|---|---|---|
| 4,978,233 | 12/1990 | Stotzel et al. | 384/12 |
| 5,391,002 | 2/1995 | Eigenbrod | 384/12 |

*Primary Examiner*—Lenard A. Footland
*Attorney, Agent, or Firm*—Rines and Rines

[57] ABSTRACT

A modular hydrostatic bearing for use in precision machine tools and the like, where a load is supported by bolting it to modular bearing carriages or trucks which ride on parallel bearing rails, where the carriages or trucks are kept from making physical contact with the bearing rails by hydrostatic bearing pockets formed in the carriages, and where the bearing rail has two sides and two or more surfaces per side that form load carrying surfaces that the hydrostatic bearing pockets run against, and where the bearing rail load carrying surfaces have precision smooth continuous curves between them, such that the carriage can be formed with a mating surface containing the hydrostatic bearing pockets and also have smooth continuous surfaces between the hydrostatic bearing pockets, such that the carriage can be fitted over the rail with clearance suitable for hydrostatic bearing operation, but greatly reduced leakage flow because there is no direct leakage flow to the atmosphere from between sets of adjacent load carrying hydrostatic bearing pockets; and wherein the special curved profiles of the rails create surfaces with which carriages' hydrostatic bearing pockets react to support a load, and in which the rails also have special contours that create surface self compensating resistance paths directly between the pressure supply grooves and the load-bearing hydrostatic pockets, and in which the special compensation contours are oriented at an angle to the leakage paths from the hydrostatic pockets to the drains, thereby causing flow to the hydrostatic pockets inversely proportional in relation to the amount of bearing gap closure between the pockets and the rail.

11 Claims, 21 Drawing Sheets

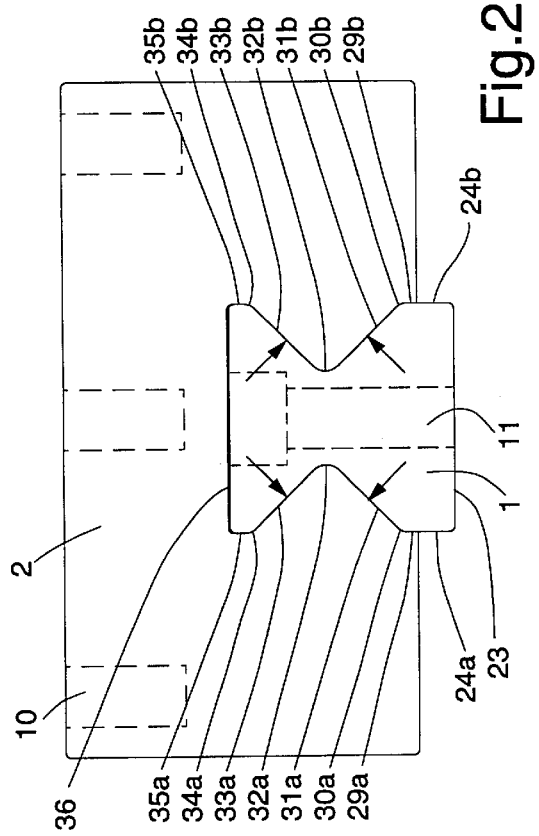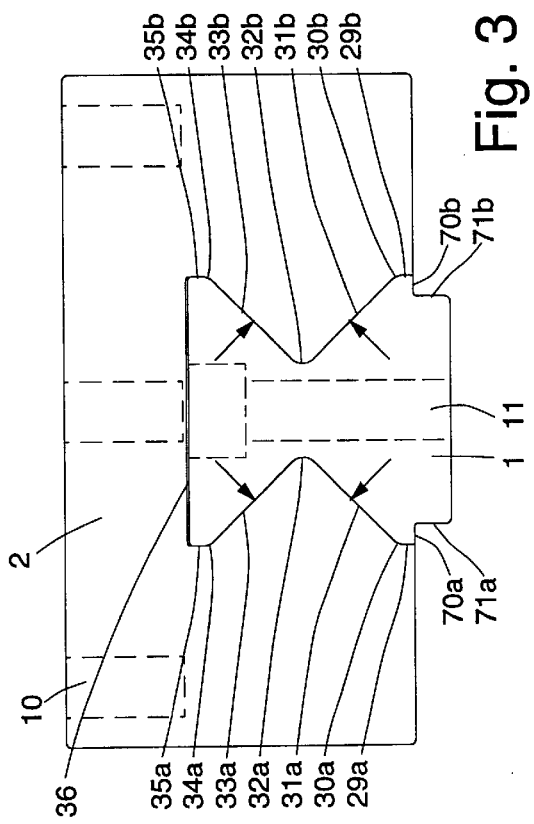

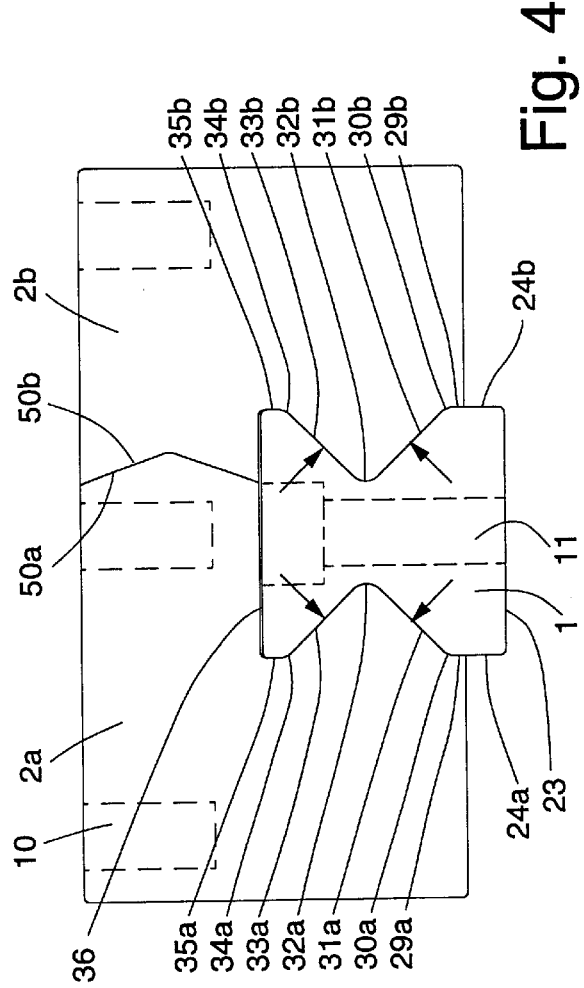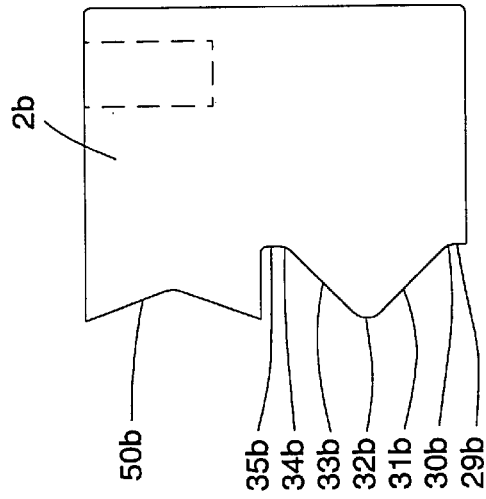

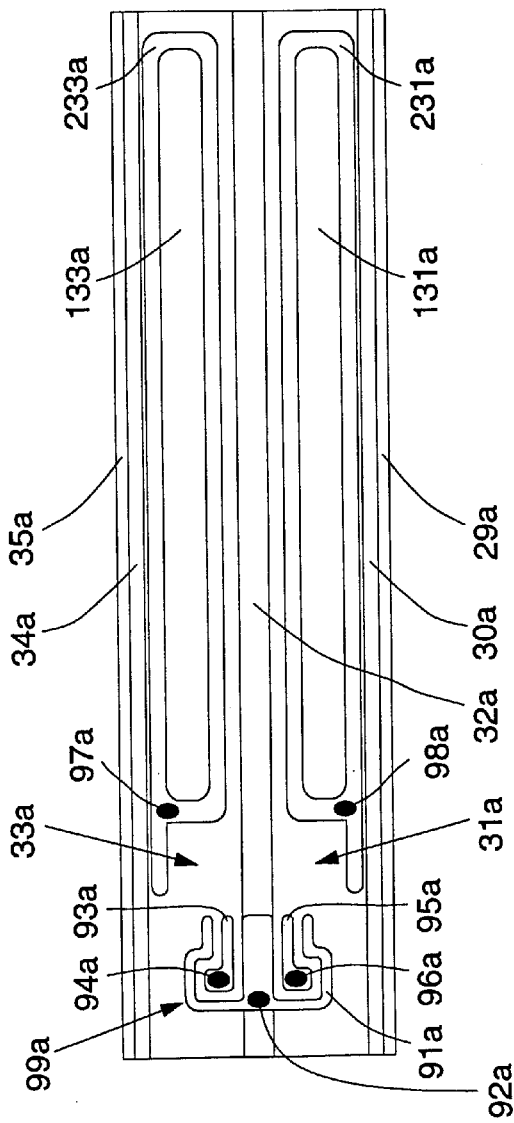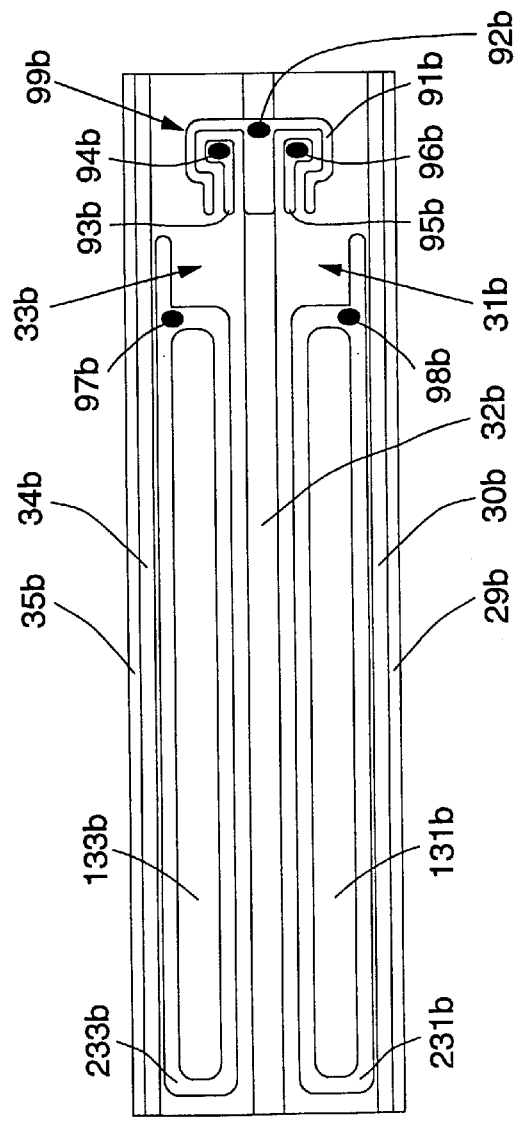

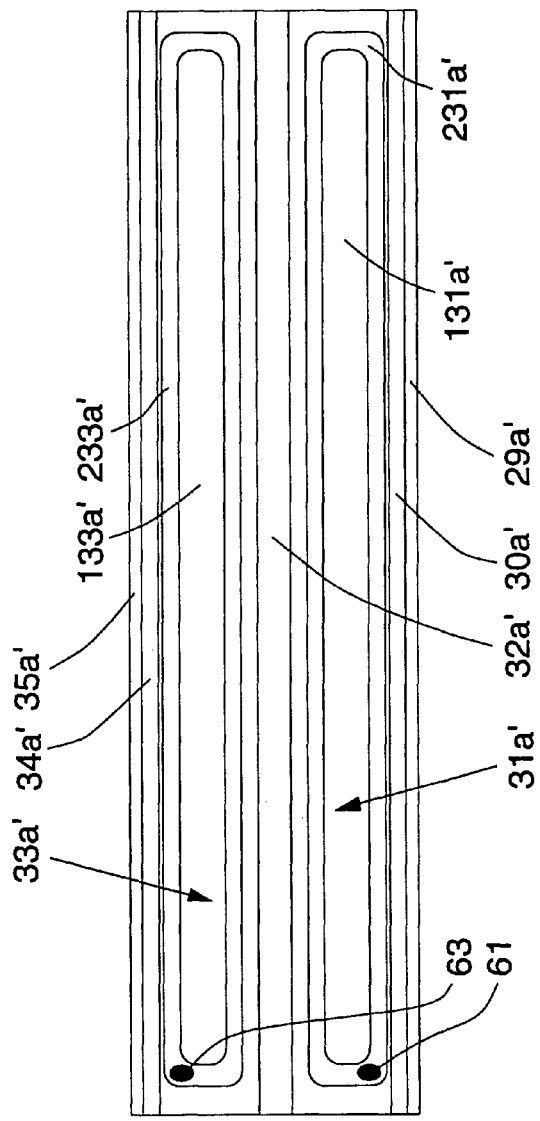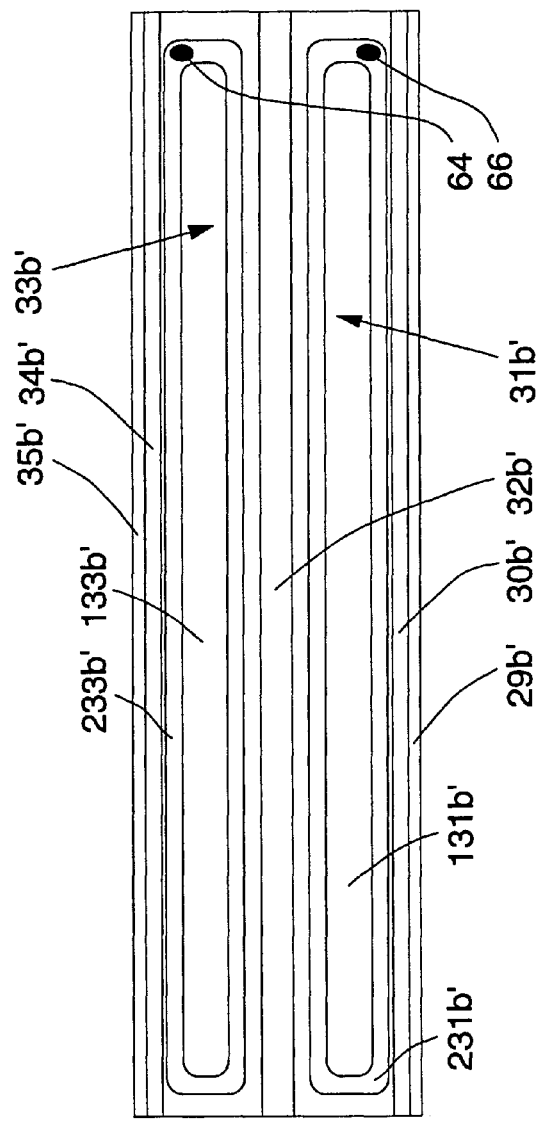

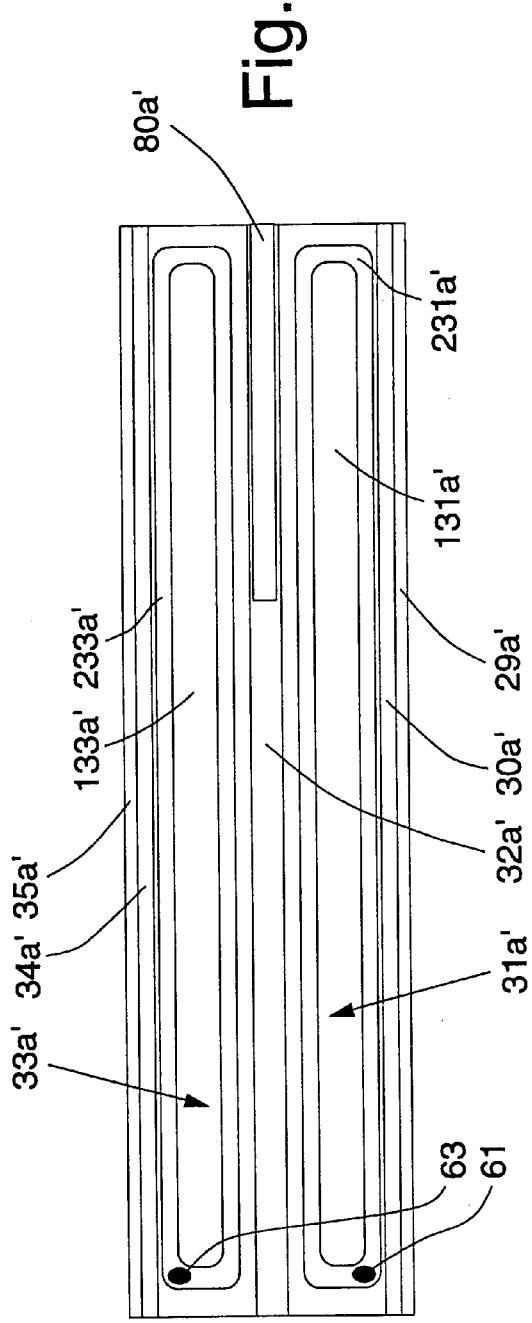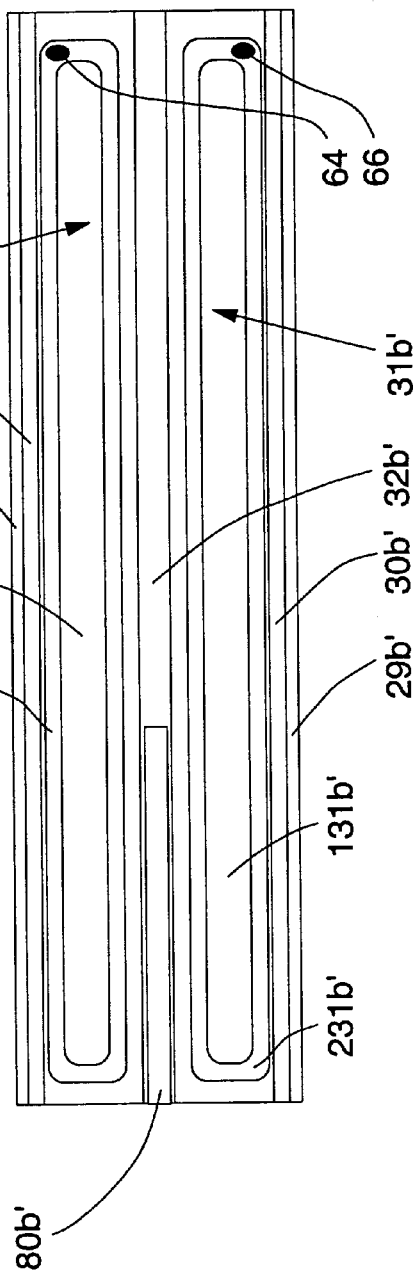

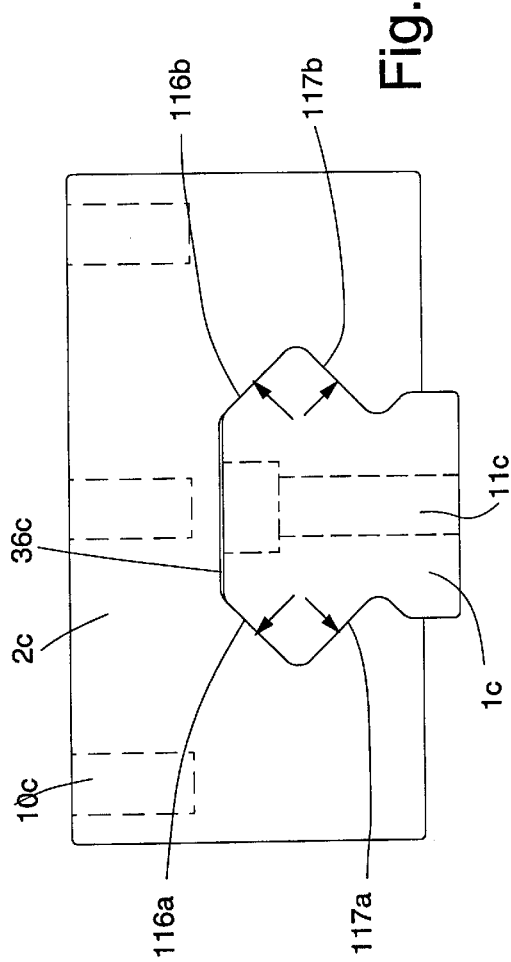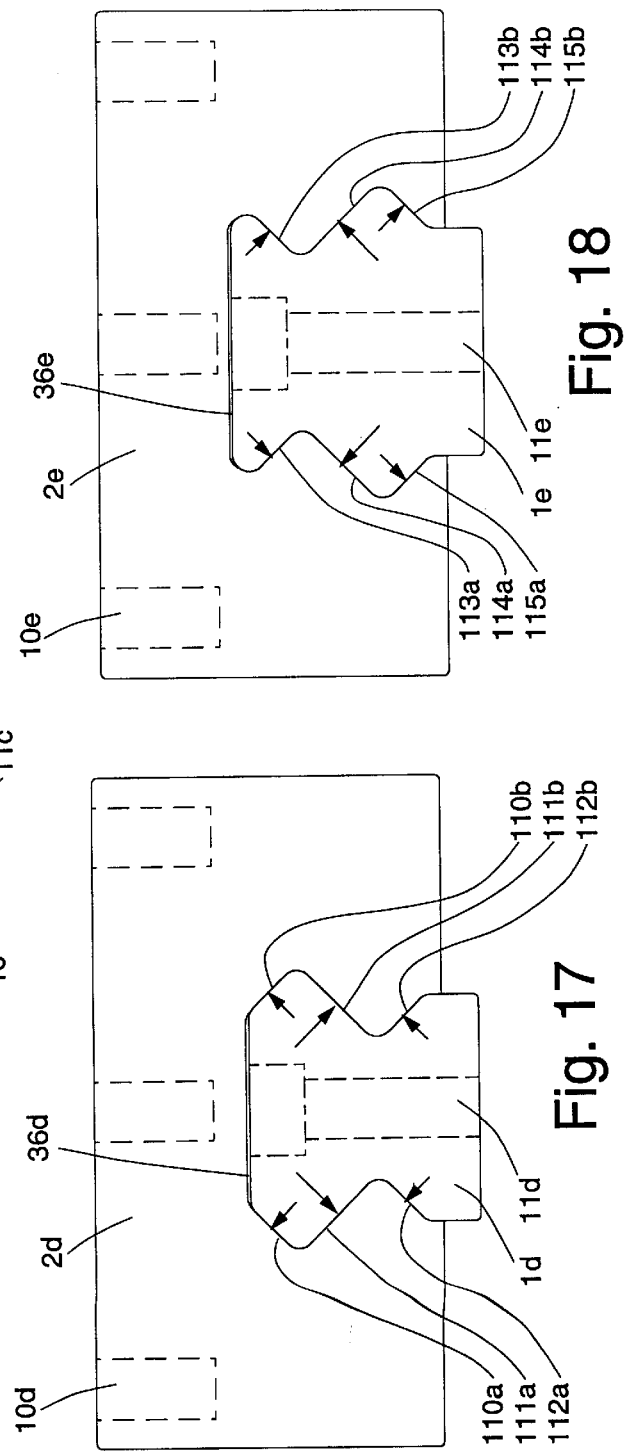

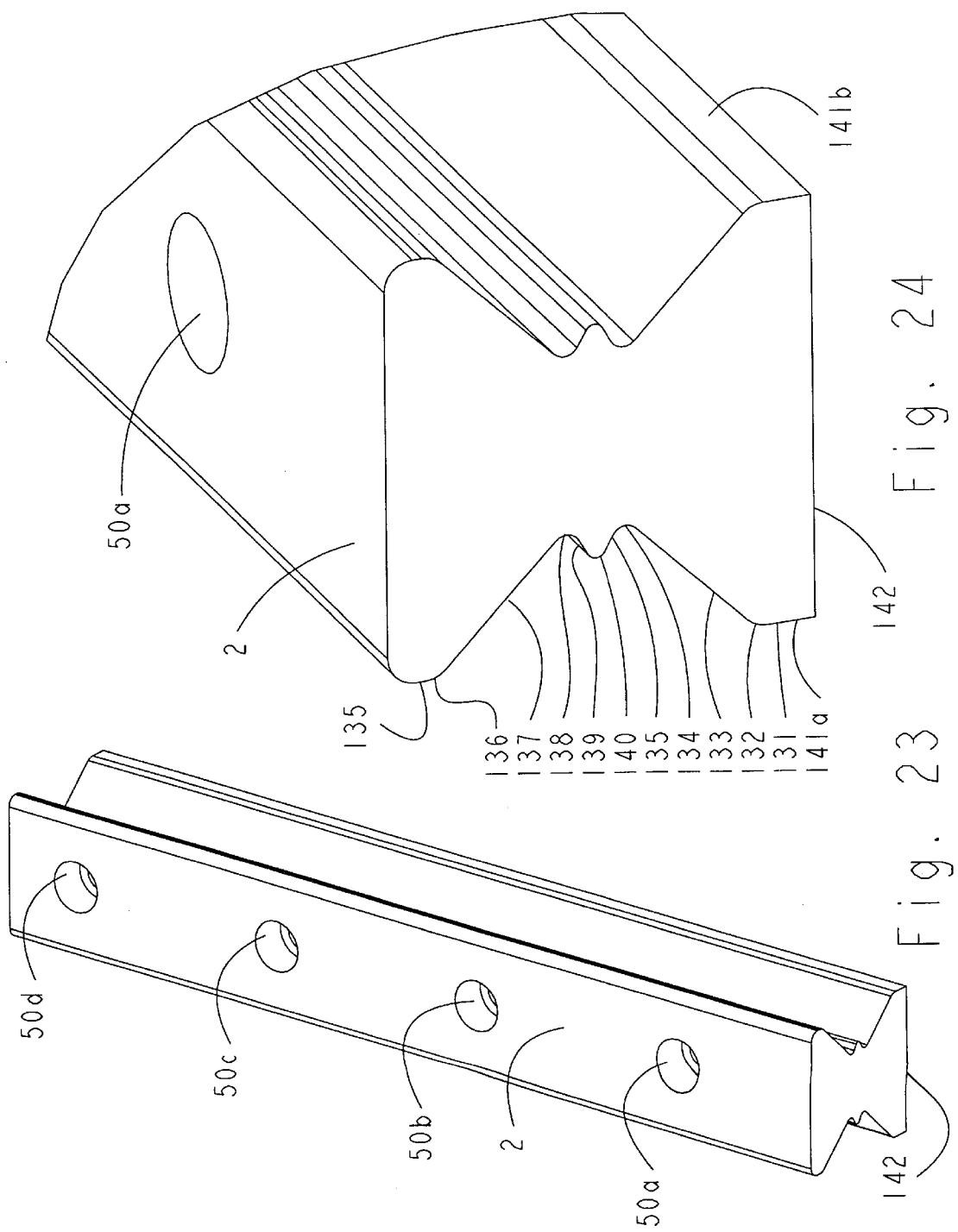

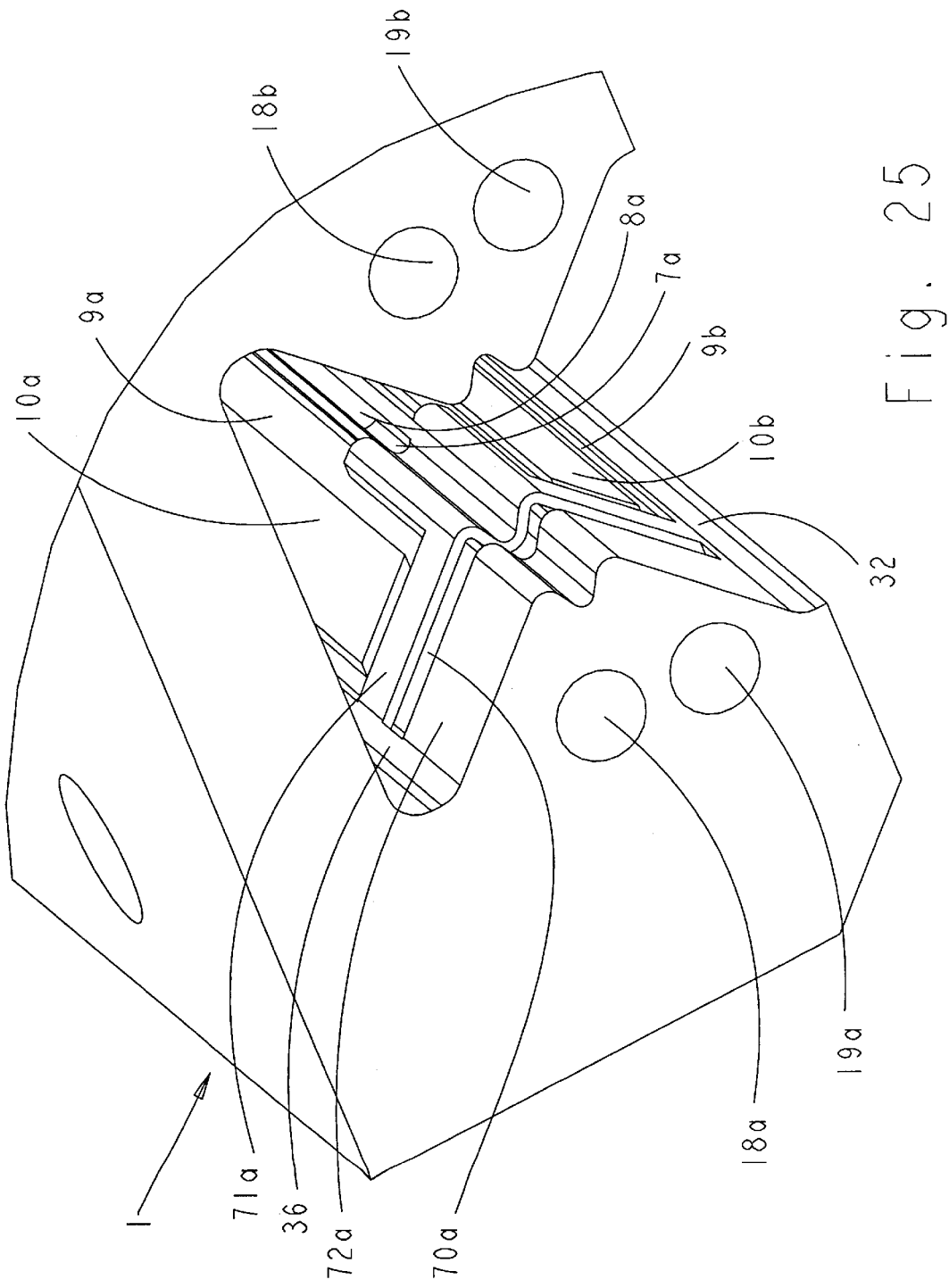

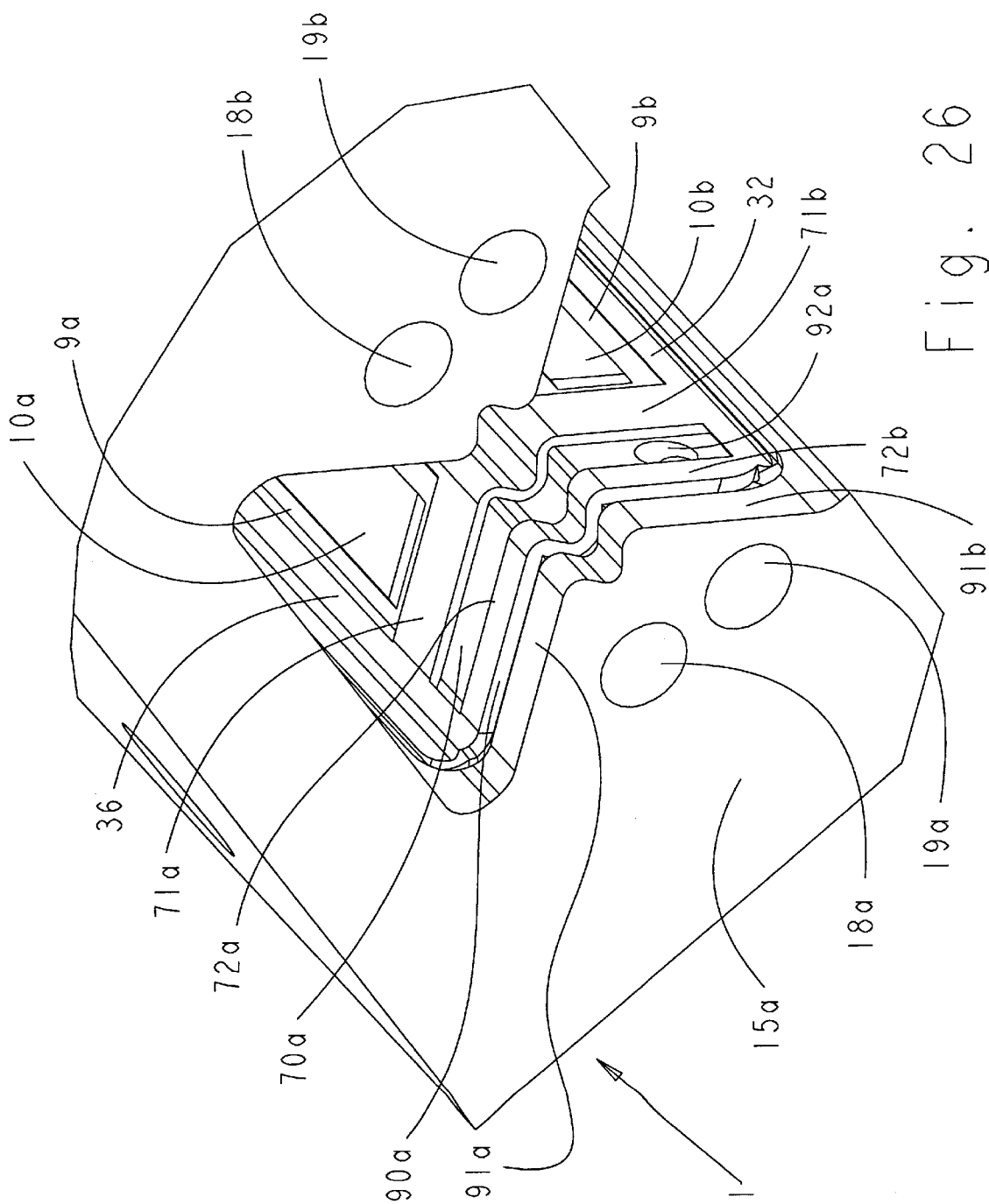

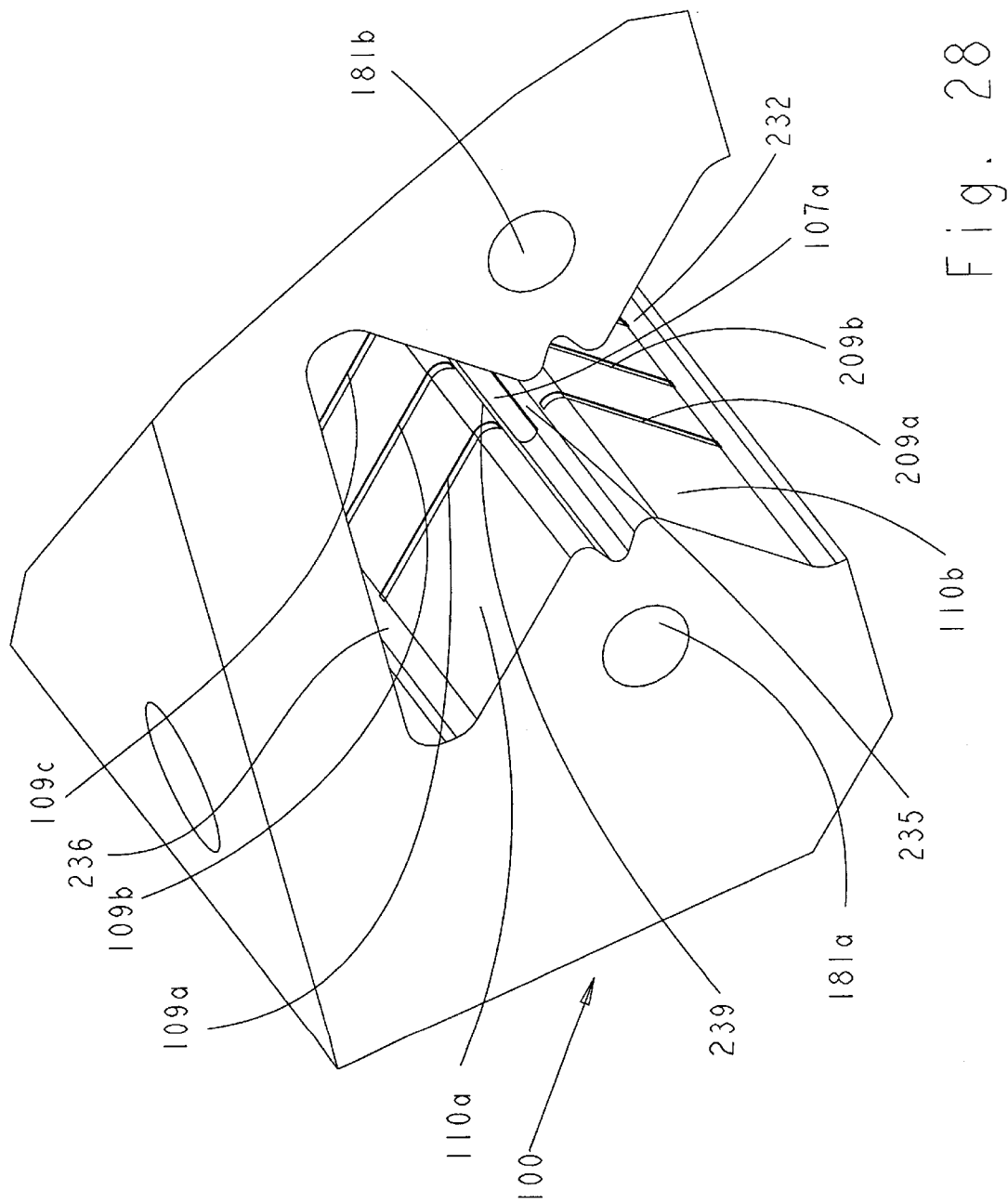

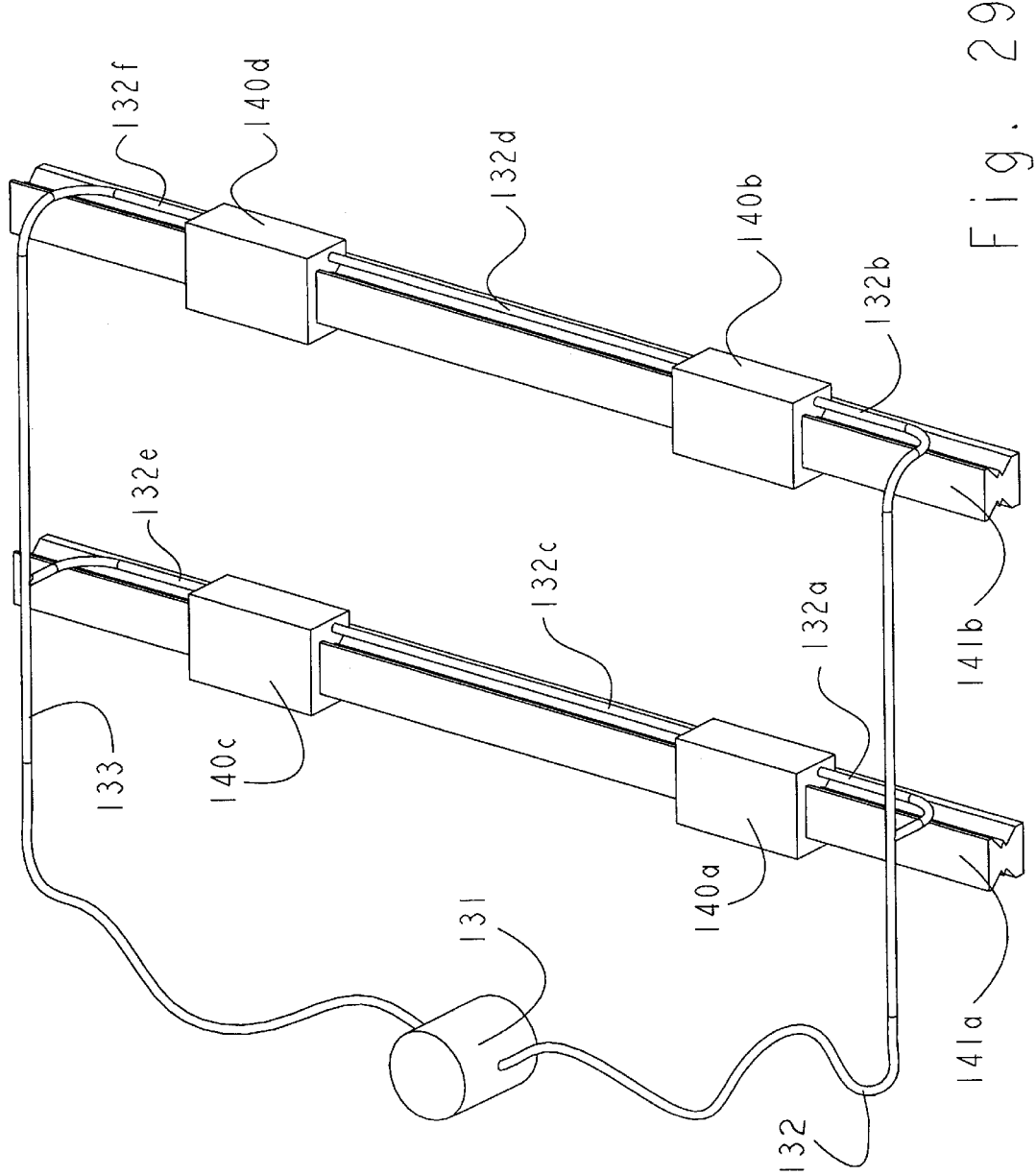

| Fluid Properties | | | |
|---|---|---|---|
| Fluid Temperature | C, F | 32.2 | 90 |
| Viscosity | Ns/m^2, cSt | 0.0300 | 34 |
| Density | kg/m^3 | 875 | |
| Specific Heat | kJ/kg/degK | 1.95 | |
| Fixed Parameters | | | |
| Supply Pressure | Pa, psi | 6.89E+06 | 1,000 |
| Bearing Gap | um, in | 20.32 | 0.000800 |
| Clearance, compression | um, in | 21.62 | 0.000851 |
| Clearance, tension | um, in | -21.62 | -0.000851 |
| Clearance, lateral | um, in | 20.32 | 0.000800 |
| Maximum closure | % | 50% | |
| Operating closure | % | 10% | |
| % gap tolerance | % | 10% | |
| Performance of a Truck | | | |
| Compressive Load, 50% gap closure | lb | | 1,723 |
| Tensile Load, 50% gap closure | lb | | 1,723 |
| Lateral Load, 50% gap closure | lb | | 1,539 |
| Average Compressive Static Stiffness | lb/uin | | 4.31 |
| Average Tensile Static Stiffness | lb/uin | | 4.31 |
| Average Lateral Static Stiffness | lb/uin | | 3.85 |
| Friction @ 1 m/s | lb | | 2.84 |
| Friction Power @ 1 m/s | W | | 12.6 |
| Avg. fluid velocity exiting pockets | m/s | | 0.63 |
| Max. fluid velocity exiting pockets | m/s | | 0.95 |
| Fluid Flow | gpm | | 0.10 |
| Pumping power | hp | | 0.057 |
| Fluid temperature increase @ 0m/s | deg F | | 7.3 |
| Fluid temerature increase @ 1 m/s | deg F | | 9.4 |
| Rail Parallelism tolerance | mm | | 0.004 |
| Roll tolerance | rad | | 1.0E-04 |
| Pitch tolerance | rad | | 2.9E-05 |
| Yaw tolerance | rad | | 2.7E-05 |
| Compressive Load Efficiency | % | | 45% |
| Tensile Load Efficiency | % | | 45% |
| Lateral Load Efficiency | % | | 28% |
| Load to Optimize For | N | | 6,846 |
| Load normalized by pump power | N^2/W | | 1.10E+06 |

| Dimensions | |
|---|---|
| For Upper and Lower Pads | |
| Linear dimensions (mm) | |
| Radius, edge | 1.50 |
| Radius, neck | 1.50 |
| Radius, nipple | 1.00 |
| Carriage length | 150.00 |
| Restrictor length | 22.00 |
| Restrictor width | 1.50 |
| Pocket corner radius | 1.00 |
| Inner long land width | 2.50 |
| Pocket width | 3.38 |
| Outer long land width | 2.50 |
| Edge long land width | 1.57 |
| End land width | 4.00 |
| Land angles (deg from horizontal) | |
| Edge land | 90 |
| Uppper pad | 35 |
| Upper restrictor | -20 |
| Lower restrictor | 20 |
| Lower pad | 35 |
| Edge land | 90 |

Fig. 30

MODULAR HYDROSTATIC BEARING WITH CARRIAGE FORM-FIT TO PR

The application is a continuation-in-part of Serial No. 08-622843 filed Mar. 27, 1996.

The present invention relates to modular hydrostatic or aerostatic bearings for use in precision machine tools and the like, where it is important to make the modular bearings bolt-for-bolt compatible with similar modular rolling element bearings for linear motion; being more particularly directed to modular linear hydrostatic bearings, wherein the rail has a special contoured profile that creates the surfaces with which the hydrostatic bearing pockets react to support a load, the rail having such special contours to enable creating surface self-compensating resistance paths directly between a pressure supply groove and a load-bearing hydrostatic pocket, where the special compensation contours are oriented at an angle to the leakage paths from the hydrostatic pockets to the drains, thereby causing flow to the hydrostatic pockets inversely proportional in relation to the amount of bearing gap closure between the pockets and the rail.

BACKGROUND

Hydrostatic bearings are well known in the machine tool industry to provide the most accurate friction-free motion, and the longest life. With the need for ever greater accuracies to make higher quality parts, and the need for higher production rates which increase total accumulated travel on the machine bearings, an alternative is needed to the popular modular rolling element linear bearings that are commonly sold in the machine tool industry.

One feature of rolling element linear motion bearings is their relatively small profile. Another feature is their ease of use: A machine tool builder need only take the bearing out of the box and bolt it down. In today's world of modular order-what-you-want and it will be easily customized, it would be of great value to have a modular hydrostatic bearing that may be made bolt-for-bolt compatible with existing modular rolling element linear bearings.

There are a great many hydrostatic bearing designs currently available. All require a means to restrict the flow (compensation) as described, for ex ample, by A. H. Slocum in *Precision Machine Design,* Prentice Hall, Englewood Cliffs. N.J., 1992. Orifice compensated hydrostatic bearings, for example, are well-known in the art.

Unlike bearings that make mechanical contact, surface features cannot create error motions because the fluid layer always keeps components separated. Furthermore, unlike hydrodynamic bearings, the fluid film is kept at a nominal thickness by the external pressure source and the inlet restriction method that creates in effect a Wheatstone bridge fluid circuit. However, unlike a conventional bridge circuit, all the resistors are highly nonlinear, because they are in effect fluid resistors whose resistance is a function of flow between surfaces. Typically, the fluid resistance is a function of the bearing gap to the third power. However, the nominal bearing gaps are typically on the order of 20 microns, but manufacturing errors are on the order of 3 microns. Thus the nominal bearing resistance can vary from $(20-3)^3=4913$ to $(20+3)^3=12167$. This represents a threefold variance in initial conditions, whereas to obtain good performance, bridge resistors, which provide compensation to the circuit, should initially be within a few percent of each other. In the past, the inlet resistances have been made from orifices or capillaries, which are tuned to the bearing gaps on an individual basis. As a result, hydrostatic bearing machines are very expensive and have a reputation of being very fickle.

Applying hydrostatic bearing technology to the basic profile rail shape used for existing modular rolling element bearings, however, requires high pressures, in the range of 30 to 100 bar, in order to obtain reasonable load capacity and stiffness characteristics in view of the small surface areas available. The fact that the perimeter of each of the four hydrostatic bearing pockets required to support the bearing carriage is typically open to a drain to the atmosphere, furthermore, causes the flow rate to be very high. Reducing flow rate is highly desirable because it results in more efficient, lower cost filtration, and reduces drainage system cost. Furthermore, reducing flow rate reduces the pump power proportionally, which has major benefits including a lower cost and more compact pumping system, and less heat generation in the bearing fluid, reducing thermal errors.

To provide a durable means for preventing drainage from bearing pockets to the atmosphere, it is highly desirable to provide smooth contours, using large rounds between adjacent load bearing surfaces. In one prior art design with a profile rail, U.S. Pat. No. 4,978,233, all of the profile rails disclosed are formed with sharp edges. Sharp edges and/or very small rounds are, however, highly undesirable for sealing flow between adjacent bearing pockets because the fine edges are highly susceptible to damage and erosion, and also to manufacturing errors due to wear of fine edges on the forming tool. It should be noted, also, that in order to achieve hydrostatic stiffness, for each load bearing surface there must be at least one separate fluid pocket with its own individual pressure compensation means. In one embodiment of the prior art design of U.S. Pat. No. 4,978,233, separate load bearing pockets are not even provided, and hence individual compensation is impossible; and in the other embodiment presented, the compensation means presented using throttling holes is highly impractical because there is no means for tuning the resistances of the throttling holes once the disclosed bearing is assembled, and any such throttling holes shown are susceptible to deformation when the disclosed bearing insert is formed prior to assembly. The patentees, moreover, teach and show sharp-corner discontinuous design wherein a drain region is created between the pockets at the sharp rail corner, and they demonstrate no understanding whatsoever of the need, discovered by applicants herein, for smooth profile contours to prevent axial leakage between the pockets along the rail length, or of applicants discovery and teaching, later detailed, that a smooth blended profile contour between the load regions of the rail achieves a much greater degree of load capacity.

Improved operation is described in U.S. Pat. No. 5,104,237 by applicant Slocum wherein a method for using surface features on the bearings near the bearing pockets is employed to create the inlet fluid resistance. The pressure supply system fluid is therein flowed across a compensator land region to a collector groove which then connects to an opposing pocket by tubing or manifolding. Thus the compensator pocket is opposed to the bearing pocket, and a feedback circuit results.

In U.S. Pat. No. 5,466,071 by applicant Slocum and Wasson, there is disclosed the use of self compensation where the collected fluid is taken to the bearing pad by a thin channel that wraps around a shaft. Intuitively one would think that the fluid must be contained within a channel during its travel to the opposed bearing surface, but analysis showed this not to be true.

The problem with hydrostatic bearings, even those that are self-compensated as above, is that the bearings operate off of rectangular steel rails which are not compatible with existing popular profile bearing rails rolling element linear motion bearings. The pending invention in its revision, stemming from parent application Ser. No. 08/622,843 herein, provides an important solution through a design for a modular hydrostatic bearing that has a very high efficiency based on a special continuous smooth curve profile ground into the envelope of a profile rail bearing. This provides a durable means to cut the leakage flow in half, and enables easy manufacture of the bearing rail and mating carriage, such that orifice compensated, self-compensating, or other types of hydrostatic bearings can now easily be made modular and compatible with modular rolling element bearings admirably useful in linear motion bearing rail applications and the like.

The self-compensated form of the parent application presented herein requires that the fluid in the collector be manifolded to the opposed bearing pocket, while this is well deliverable, in the small spaces allotted to some modular hydrostatic bearings, this manifolding can be expensive. Also, it is difficult to avoid high leakage flows from the compensator supply groove where the small spaces are allotted.

In a similar philosophical approach to the surface compensation used by applicant Slocum and Wasson in said U.S. Pat. No. 5,416,071, the design of the present invention has been further modified in its special herein uses special shapes on the bearing surface to compensate the flow and deliver it directly to the bearing pocket without requiring any special tubing or manifold connections, thereby also enabling the invention to be more economically produced and operated even with small space bearing constructions.

Given these drawbacks, prior art hydrostatic modular linear motion bearings have not heretofore performed satisfactorily and thus have been deemed economically unfeasible.

OBJECTS OF THE INVENTION

An object of the present invention, accordingly, is to provide a new and improved design for a modular linear motion bearing rail that can support a hydrostatic bearing carriage with minimal leakage while still being bolt-for-bolt compatible with modular rolling element linear motion bearings.

A further object is to provide a new and improved design for a modular linear motion bearing carriage supported with respect to its guiding bearing rail by hydrostatic bearings where the carriage bearing surface profile is smooth and continuous between adjacent bearing pockets to durably minimize leakage and hence minimize required pumping power.

A further objective is to provide a novel design for a modular linear motion bearing carriage which can be precision ground in two matable halves, such that they can be assembled about the mating bearing rail, with a continuous bearing gap maintained between adjacent bearing pockets so as to eliminate external leakage from the region between the bearing pockets.

Another object of this invention is to provide a novel modular hydrostatic bearing construction wherein carriages work in conjunction with specially profiled rails to achieve self compensation.

Still a further object is to provide for surface self compensation of the hydrostatics through surface features on the rail and carriage that do not require the output of one compensation surface to be manifolded or piped to a pocket on the other side of the rail.

An additional object is to provide compensation with the use of profile surfaces on the rail and carriage that have different rates-of-closure than the output flow lands of the pockets, thereby facilitating surface self compensation and the elimination of the need for complex manifolds.

Other objects object of the invention are to provide such novel bearing structures that substantially surround the pressure supply grooves with the bearing pockets, such that most of the flow goes to compensation, and little to leakage so the bearing is very efficient; and, further to apply the surface self compensation profiles to the use of air, if desired, as the working fluid to achieve in the same profile, although with reduced bearing gaps, a modular aerostatic bearing.

Another object of the invention is to provide in hydrostatic bearings, a larger gap on the axial leakage land for the supply groove, than exists for the compensation lands, so those contamination particles will exit the bearing.

And still an additional object of the invention is to provide in the bearings pass-through pressure supply lines, with a return to the supply system, such that larger particles will pass through because they will tend not to travel into orthogonally cut channels that lead to the pressure supply grooves in the bearings.

Other and further objects will be explained hereinafter and delineated in the appended claims.

SUMMARY

In summary, the present invention relates to modular hydrostatic bearings for use in precision machine tools and the like, where a load is supported by bolting it to modular bearing carriages which ride on long bearing rails, where the carriages are kept from making physical contact with the bearing rails by hydrostatic bearing pockets formed in the carriages, and where the bearing rail has two sides and two or more surfaces per side that form load carrying surfaces that the hydrostatic bearing pockets run against, and where the bearing rail load carrying surfaces have precision smooth continuous curves between them, such that the carriage can be formed with a mating surface containing the hydrostatic bearing pockets and also have smooth continuous surfaces between the hydrostatic bearing pockets, such that the carriage can be fitted over the rail with clearance suitable for hydrostatic bearing operation, but greatly reduced leakage flow because there is no direct leakage flow to the atmosphere from between sets of adjacent load carrying hydrostatic bearing pockets; and where the rail may be formed by precision profile grinding, and the carriage formed, for example, by broaching, replication, wire EDM, or split to allow it to be profile ground.

In this invention, advantage is taken of modem manufacturing techniques to produce a linear motion bearing rail with an accurate profile all along the surfaces which are load bearing and the curved portions between the load bearing portions such that an accurate form fitting carriage can fir over the rail with a controlled clearance all along the accurate profile, thereby limiting the number of leakage paths from the hydrostatic support pockets to the atmosphere, because adjacent hydrostatic pockets will now no longer be separated by drains formed by previously required grinding relief grooves between load bearing surfaces on the rail and in the carriage.

From an additional viewpoint, the invention is concerned with modular linear hydrostatic bearings, where the rail has a special profile that creates the surfaces with which the hydrostatic bearing pockets react to support a load, with the matching rail having special contours that create a surface self-compensating resistance path directly between a pressure supply groove and a load-bearing hydrostatic pocket, and wherein the special compensation contours are oriented at an angle to the leakage paths from the hydrostatic pockets to the drains, thereby causing flow to the hydrostatic pockets inversely proportional in relation to the amount of bearing gap closure between the pockets and the rail. Lacking long distances between the compensation and the pockets, such novel bearings can even operate with air as the working fluid if the bearing gaps and pocket volumes are kept to a minimum. Clean operation is obtained with the use of a greater gap for the axial sealing lands at the ends of the supply grooves, and the use of pass-through lines in the carriages which provide a return flow path to the pressure supply system.

Preferred and best mode embodiments and techniques are hereinafter described.

DRAWINGS

The present invention will now be described with reference to the accompanying drawing in which:

FIG. 2 is an end view of a back-to-back load carrying design for the modular hydrostatic bearing system, where the rail base is form-compatible with existing modular rails for rolling elements;

FIG. 3 is an end view of a back-to-back load carrying design for the modular hydrostatic bearing system, where the rail base has a step to make it compatible with existing modular rails for rolling elements, while allowing for a larger load-carrying region;

FIG. 4 is an end view of a back-to-back load carrying design for the modular hydrostatic bearing system, similar to that in FIG. 2, but the carriage is split into two precision-ground halves that make profile grinding of the carriage easier;

FIG. 5 is an end view of one side of the profile ground carriage shown in FIG. 4;

FIGS. 7 and 8 are unwrapped face views of the bearing surfaces on both sides of the self-compensated modular hydrostatic bearing shown in FIG. 6;

FIGS. 12 and 13 are unwrapped face views of the bearing surfaces on both sides of the externally compensated modular hydrostatic bearing shown in FIG. 11;

FIGS. 14 and 15 are unwrapped face views of the bearing surfaces on both sides of the externally compensated modular hydrostatic bearing shown in FIG. 11 with partial central drain grooves included;

FIG. 16 is an end view of a version of the invention where the load bearing surfaces are arranged in a face-to-face load bearing configuration;

FIGS. 17 and 18 are end views of modified versions of the invention where the load-bearing surfaces are tiered to give a greater effective area;

FIG. 23 is an isometric view of a section of the carriage's matching rail;

FIG. 24 is a close up isometric partial view of the rail;

FIG. 25 is a close up isometric partial view of the carriage with a special groove and supply line for high speed operation;

FIG. 26 is a close up isometric partial view of the carriage with special grooves for collection of the fluid and sealing of the carriage;

FIG. 28 is a close up isometric partial view of the carriage showing the special shallow grooves for creating an air bearing effect with the carriage;

FIG. 29 is a schematic isometric of the system with some of its fluid supply lines;

FIG. 30 is a spreadsheet used by one skilled in the art of fluid mechanics and hydrostatic bearings to engineer the dimensions of the bearings herein.

PREFERRED EMBODIMENT(S) OF THE INVENTION

This invention, as explained in said parent application, achieves its objectives by establishing the relative position of a carriage to a bearing rail with the use of hydrostatic (or aerostatic, as will be used interchangeably here since both rely on externally pressurized flows) bearings. The key is to minimize flow which thus also minimizes the pumping power required by the fluid source.

This can be accomplished, in accordance with the present invention, by recognizing that when adjacent pairs of hydrostatic bearing pockets are preloaded against each other, yet separated by a suitable leakage path distance, one pocket will act as a seal against leakage flow out of its neighbor's pocket, and the majority of the fluid flow out of a hydrostatic bearing pocket will thus occur along one edge only. In this manner, mainly one edge gap is modulated by load which thus acts to balance the hydrostatic pressure by the action of a fluid circuit similar to that of a Wheatstone Bridge, as is known to those skilled in the art, and discussed in detail in the above referenced textbook by the applicant Slocum.

Figure 1:
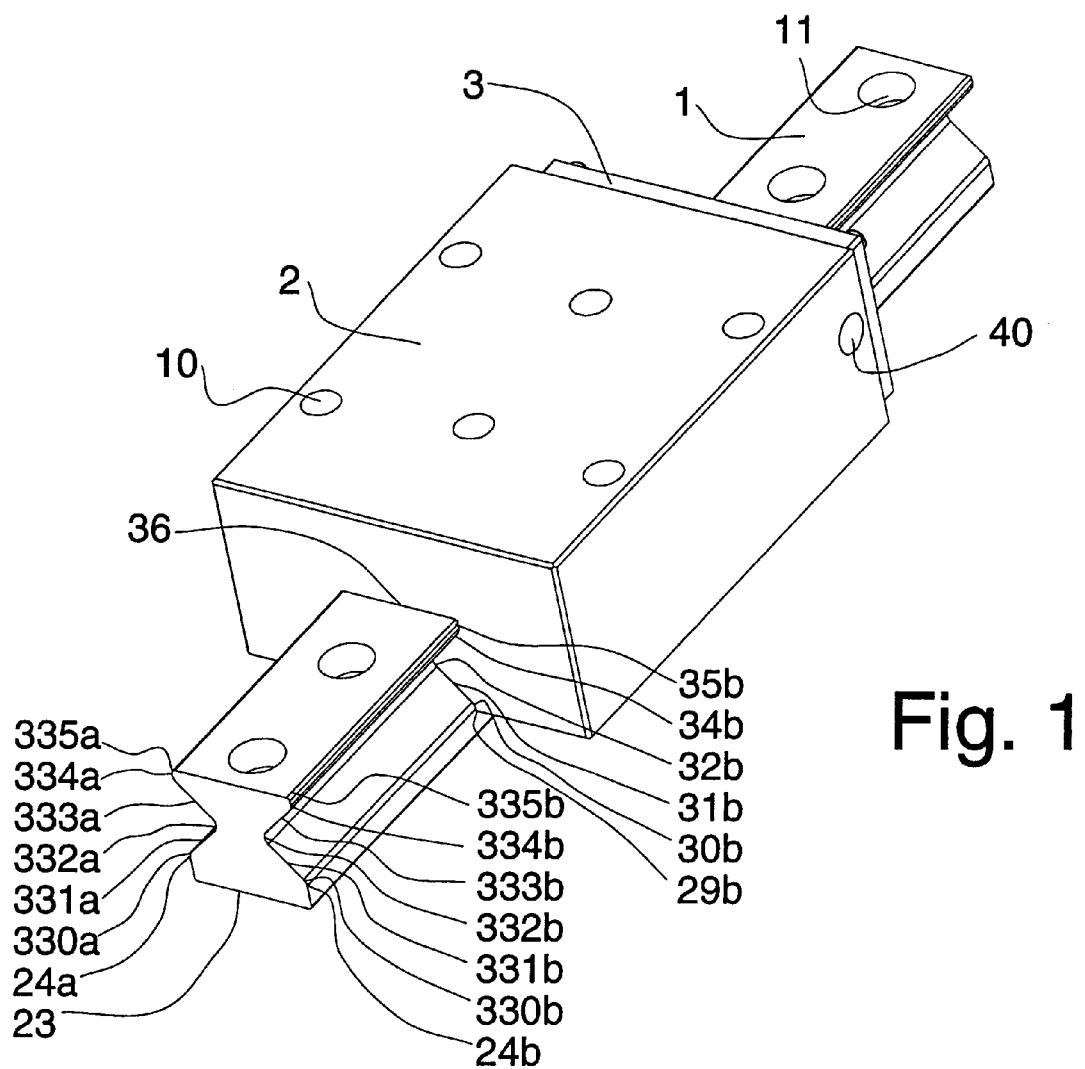
FIG. 1 is an isometric view of the modular linear motion hydrostatic bearing with the carriage form fitting to the profile rail.

FIG. 1 illustrates a back-to-back embodiment of the present invention in an isometric view, and FIG. 2 by end view, with arrows showing the direction of hydrostatic loading on the carriage. The modular bearing rail 1, which for this particular embodiment has four load bearing surfaces arranged in a back-to-back configuration (as can be recognized by those familiar with the art), has counter-bored bolt holes such as 11 that would allow it to be bolted to a machine tool bed. The rail has a precision bottom surface 23 and precision side edges 24a and 24b. The key differentiating feature between this rail of the present invention and other bearing rails used for hydrostatic bearings is the highly accurate contour that forms a precision curvilinear surface comprised of the regions on the rail 330b, 331b, 332b, 333b, 334b, and 335b. These regions are precisely and accurately mirrored features of surfaces 330a, 331a, 332a, 333a, 334a, and 335a which are on the opposite side of the rail. A high degree of accuracy can be obtained by profile-grinding the surfaces. Note that the region 36 between the top of the rail and the inside surface of the carriage should have sufficient clearance to act as a drain. The carriage 2 which rides on the rail 1 has threaded holes, such as 10, which allow a machine tool structure to be bolted to it. The carriage may also have a manifold 3 by which hydrostatic fluid is distributed as will be discussed later, or a single fluid pressure entry port 40 may be used with internal distribution.

In FIG. 1 showing an isometric view and FIG. 2 showing an end view, the carriage 2 includes bearing surfaces 35a, 34a, 33a, 32a, 31a, 30a, and 29a displaced from the corresponding rail bearing surfaces 335a, 334a, 333a, 332a, 331a, 330a, and 24a by an amount nominally used for hydrostatic bearings, and likewise the carriage 2 includes bearing surfaces 35b, 34b, 33b, 32b, 31b, 30b, and 29b displaced from the corresponding rail bearing surfaces 335b, 334b, 333b, 332b, 331b, 330b and 24b by an amount nominally used for hydrostatic bearings, which may be on the order of 5 micrometers for air bearings and 50 micrometers for viscous oil bearings.

In order to consider the design of the system in greater detail, FIG. 3, with arrows indicating the direction of hydrostatic loading, shows the end view of a system like that of FIG. 2, where the rail 1 is formed with a base 23 that is compatible with existing modular rolling element bearing rails, as by the use of counter bored bolt holes 11 with which to attach the rail to a machine base. To give a greater hydrostatic bearing area for increased load capacity, however, there is provided an overhanging step, defined by vertical surfaces 71a and 71b and horizontal surfaces 70a and 70b that effectively increases base width of the bearing. This allows the carriage 2 to have greater bearing areas 35a, 34a, 33a, 32a, 31a, 30a, 29a, 35b, 34b, 33b, 32b, 31b, 30b, and 29b.

The carriage 2 may be formed by broaching or wire electrical discharge machining a one-piece cast or formed or 3D printed carriage. In some cases, the desired precision could be achieved by milling or grinding the internal bearing surfaces on a one-piece cast or formed or 3D printed carriage. However, an alternative is to form the carriage as shown in FIG. 4, in which the carriage is shown formed in two bonded pieces 2a and 2b, the two pieces being profile ground separately before bonding and later bonded together using a precision boding means, such as low temperature brazing, bolting, or bolting in conjunction with use of a high strength epoxy. FIG. 5 shows one of the pieces 2b. The carriage in FIG. 4 comprising the bonded parts 2a and 2b has the same hydrostatic load carrying surfaces 35a, 34a, 33a, 32a, 31a, 30a, and 29a preloaded against hydrostatic bearing surfaces 35b, 34b, 33b, 32b, 31b, 30b, and 29b. The rail 1 still has mounting bolt holes, such as 11, bottom reference edge 23, and side edges 24a and 24b. The carriage pieces 2a and 2b still have threaded holes for mounting, such as 10. The carriage piece 2a has a precision convex mating surface 50a and the mating carriage piece 2b has a precision concave mating surface 50b. As shown in FIG. 5, the entire side surface of the bearing carriage piece 2b (and its mate 2a), which includes a precision mating surface and precision bearing surfaces, can be formed by a single profiled grinding wheel. Thus the carriage pieces can be formed with great precision for a very low price. This two piece embodiment also leaves the hydrostatic bearing surfaces easily accessible, prior to bonding, to forming by various machining methods or to surface coating by various surface coating methods well known to those skilled in the art of precision manufacturing.

Figure 6:
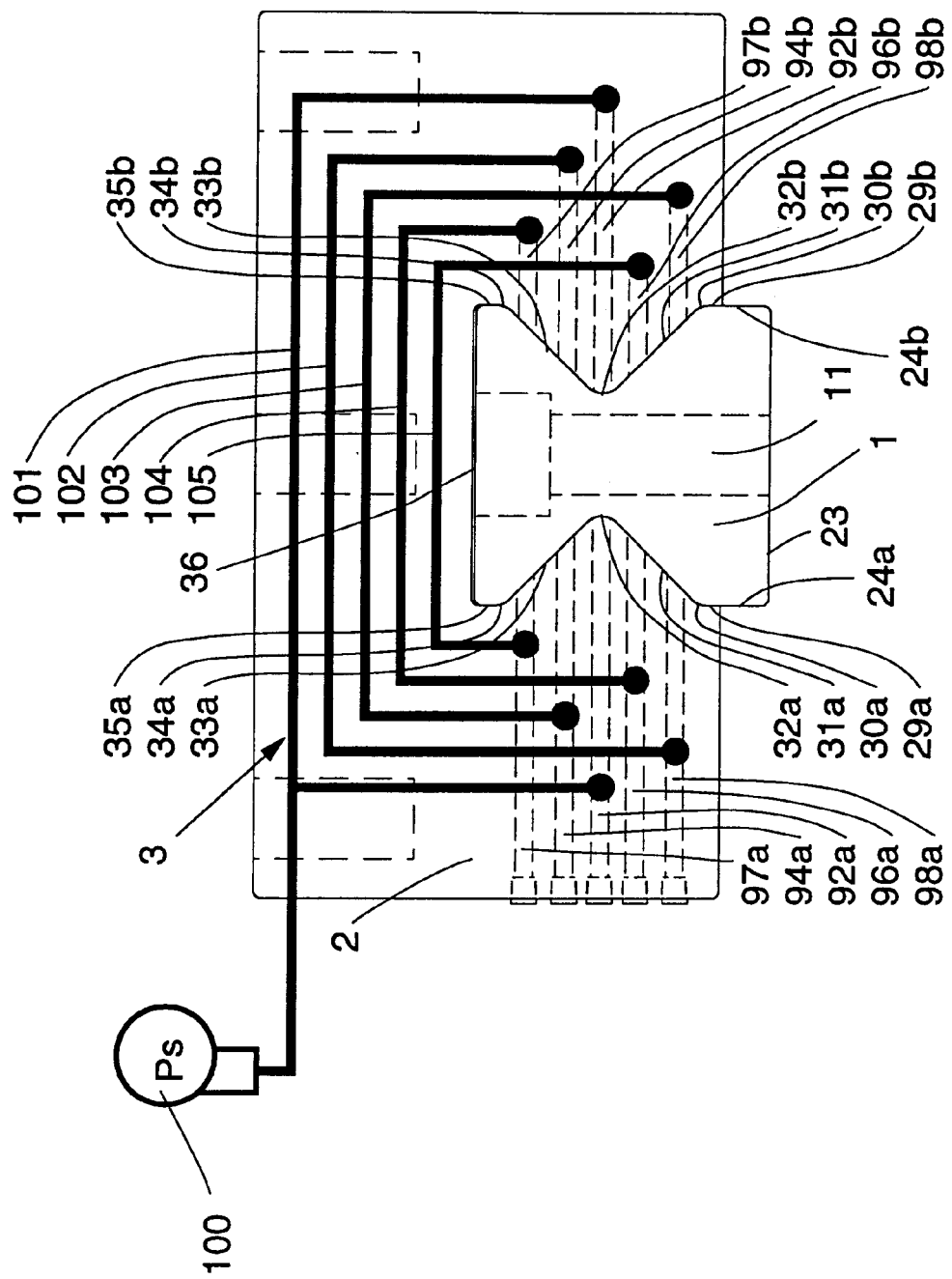
FIG. 6 is an end view of the hydrostatic bearing pads for a self-compensated modular hydrostatic bearing with carriage form-fit to the profile rail for reduced flow.

To illustrate the hydrostatic function of the system of the present invention, first consider a self-compensating hydrostatic bearing system as shown in FIG. 6, FIG. 7, and FIG. 8. In FIG. 6 the rail 1 has a form-fitting carriage 2 with an end-mounted manifold 3 which distributes fluid from pump 100 via supply lines 101 to the self-compensating units 99a and 99b. The carriage 2 has hydrostatic bearing surfaces 35a, 34a, 33a, 32a, 31a, 30a, 29a, 35b, 34b, 33b, 32b, 31b, 30b, and 29b. FIG. 7 shows an unwrapped face view of the contoured hydrostatic bearing surfaces 35a, 34a, 33a, 32a, 31a, 30a, and 29a on one side of carriage 2. FIG. 8 shows an unwrapped face view of the contoured hydrostatic bearing surfaces 35b, 34b, 33b, 32b, 31b, 30b, and 29b on the other side of carriage 2. The pressurized fluid from the pump 100 is delivered via supply lines 101 through supply holes 92a, 92b to the pressure supply grooves 91a, 91b. The pressure supply grooves 91a, 91b, the collector grooves 93a, 95a, 93b, 95b, and the bearing pocket grooves 231a, 233a, 231b, 233b typically have a depth equal to at least 10 times the nominal bearing gap, to minimize pressure drops across them. The first leakage flow saving feature of the present invention is provided because the carriage surfaces 32a and 32b are close-fitting to the rail, so the pressure supply grooves present on one side of the carriage can share a common center. If a conventional bearing rail and carriage were fitted with self-compensating hydrostatics, then the regions 32a and 32b on the carriage would be grinding reliefs and thus serve as fluid drains, so the leakage flow from the pressure supply grooves would increase by about 30%. Note that there are other designs for self-compensating bearings as is known by those skilled in the art, that could be used here, and they also can benefit from reduced leakage flows due to the close fitting regions 32a and 32b.

Fluid from the pressure supply grooves 91a and 91b flows in a restricted manner, controlled by the gap between the carriage and the rail, as is the nature of self-compensation, across the bearing carriage surface to collector grooves 93a and 95a on one side of the carriage in FIG. 7, and to collector grooves 93b and 95b on the other side of the carriage in FIG. 8. The fluid then enters collector holes 94a and 96a, respectively, and collector holes 94b and 96b, respectively. The fluid is then channeled to opposed bearing pocket holes 98b and 97b by fluid passages 103 and 104, respectively, and to opposed bearing pocket holes 98a and 97a by fluid passages 102 and 105, respectively. Fluid then enters the bearing pocket grooves 231b, 233b, 231a, and 233a. It should be observed that inside the outer perimeter of the bearing pocket grooves 231a, 233a, 231b, and 233b there are central damping lands 131a, 133a, 131b, 133b, respectively, which are precision surfaces coplanar with the neighboring bearing lands on surfaces 31a, 33a, 31b, 33b, respectively, to provide additional squeeze film damping to the bearing carriage.

Further to illustrate the reduction in leakage flows in accordance with the present invention, consider side "a" of the carriage. The bearing pocket grooves 231a and 233a will have dominant leakage paths to the atmosphere via lands formed primarily by perimeter surfaces 29a, 30a, 34a, and 35a. The bearing pocket grooves 231a and 233a will not experience substantial "cross-talk" between them because the central surface 32a is sufficiently wide to act as a region of high resistance relative to the resistance of the perimeter surfaces 29a, 30a, 34a, and 35a. Compared to prior art designs, for which the central region 32a would be a grinding relief, the leakage flow of the present invention from the bearing pocket grooves to the atmosphere is reduced by about 40%.

The two flow reducing features of the present invention together reduce the total bearing flow rate by about 60%–70%, when compared to prior art designs, which have grinding relief drains in the central regions 32a and 32b. Since pump power is directly proportional to the pump flow rate, when operating at a given supply pressure, reducing the flow rate by 60–70% also reduces the pump power requirement by the same amount. The reduction in pump power has several major benefits for machine tool applications, including a lower cost, more compact pumping system, smaller plumbing, a lower cost and more effective filtration system, and less heat generation in the bearing fluid, which reduces thermal errors. On the other hand, load capacity and stiffness of the present invention are only marginally affected, as can be determined by standard resistance circuit analysis known to those skilled in the art.

Figure 9:
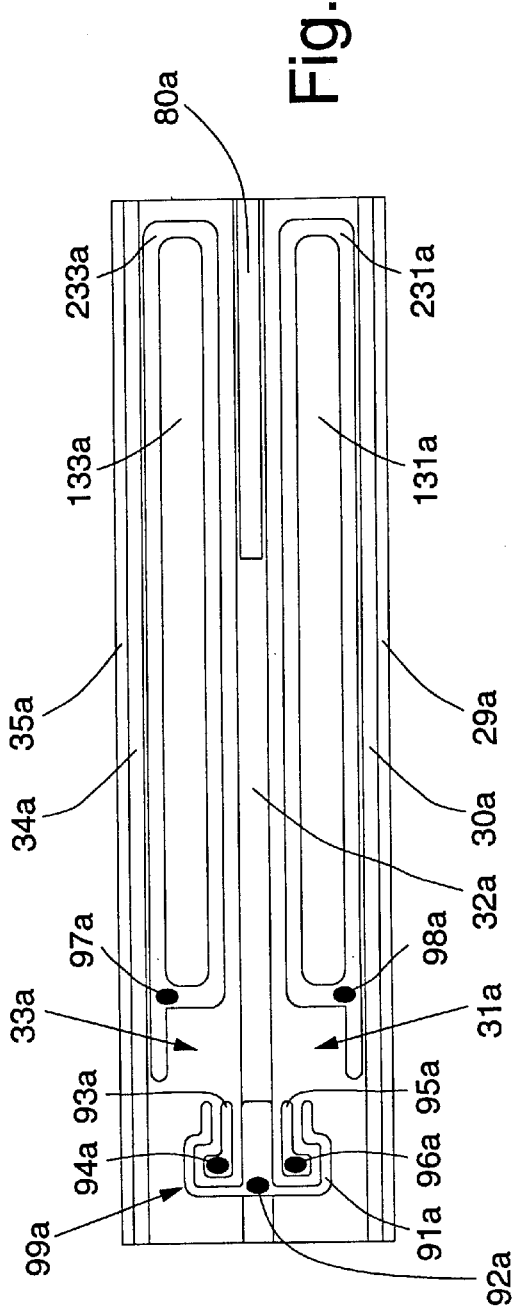
FIGS. 9 and 10 are unwrapped face views of the bearing surfaces on both sides of the self-compensated modular hydrostatic bearing shown in FIG. 6 with partial central drain grooves included.
Figure 10:
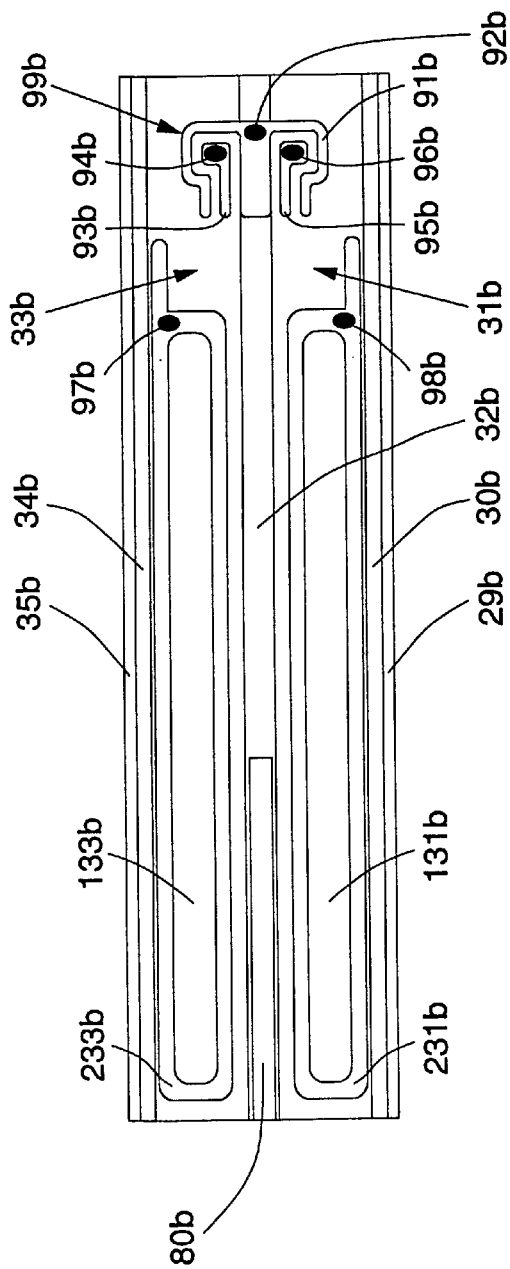

For some self-compensating embodiments, it may be advantageous to have partial central drain grooves present over some of the length, but not all of the length, of form fitting central surfaces 32a and 32b. FIG. 9 and FIG. 10 show unwrapped face views of the contoured hydrostatic bearing surfaces of the carriage 2, with partial drain grooves 80a and 80b included, which are present over some of the length of surfaces 32a and 32b, specifically between the some of the region between bearing pocket grooves 231a, 233a, and 231b, 233b. Unlike prior art designs, for which central drain grooves extend the entire length of the carriage, the length of the partial central drain groove of the present invention is a design variable, which may be used for optimization of a desired bearing characteristic, such as load capacity or pump power. Furthermore, unlike prior art designs, the partial central drain groove does not extend all the way to the supply grooves, thus allowing the flow saving central supply groove design of the present invention to be realized. One reason for having partial central drainage is that for some designs the rail may elastically deflect significantly, causing the gaps at the perimeter regions 34a, 35a, 34b, and 35b to open up significantly, thereby reducing the pressure compensating effect. The adverse effects of rail deflection can be mitigated somewhat by means of partial central drain grooves 80a and 80b, by allowing pressure compensation to occur along the centrally facing edges of the bearing pocket grooves, where less rail deflection occurs.

Figure 11:
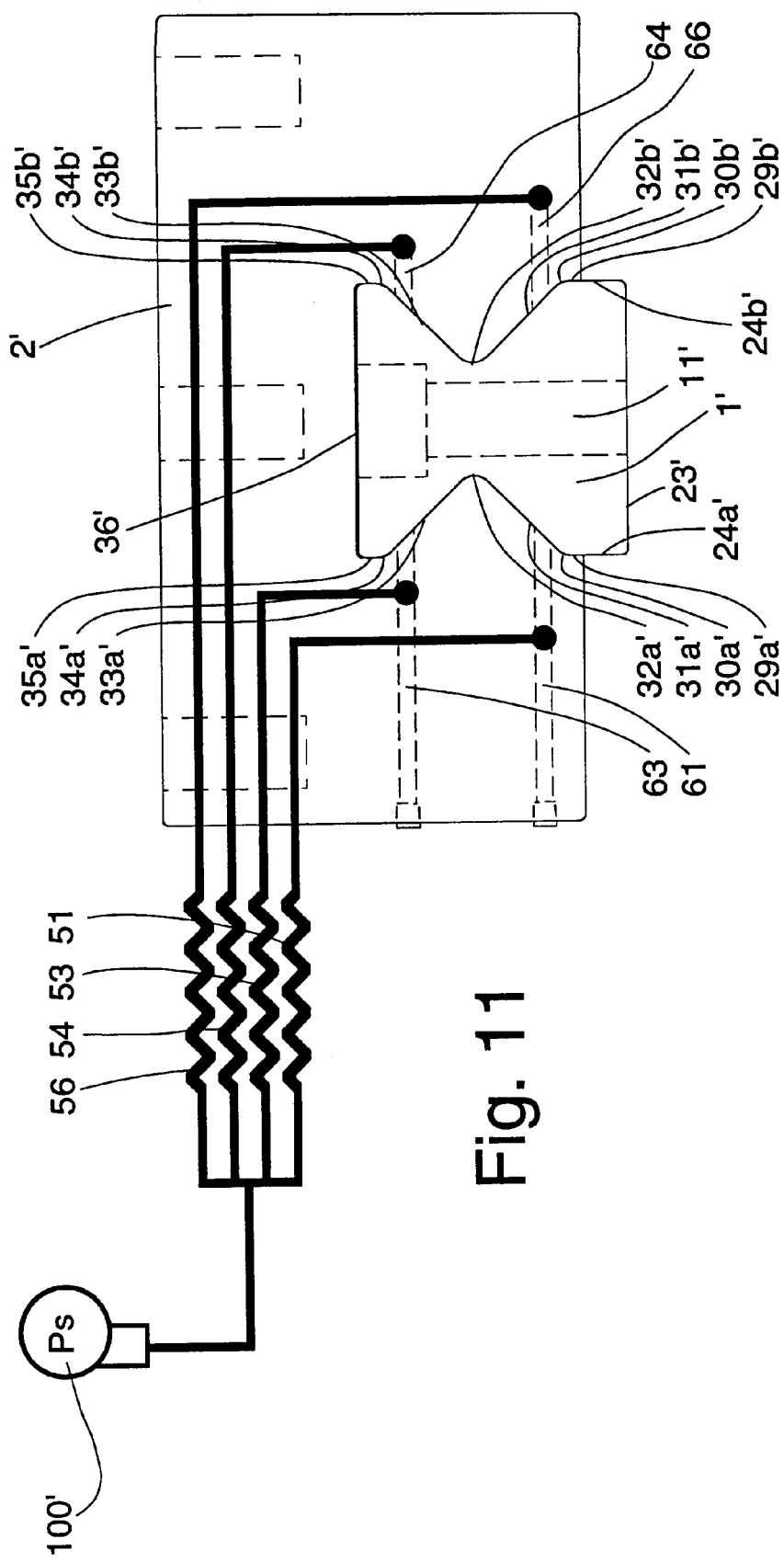
FIG. 11 is an end view of the hydrostatic bearing pads for an externally compensated modular hydrostatic bearing with carriage form-fit to the profile rail for reduced flow.

The present invention is not, however, limited to self-compensated hydrostatic bearings. In FIG. 11 is shown an end view of a bearing having fixed compensation, incorporating rail 1' with a form-fitting carriage 2' of the present invention. FIG. 12 shows an unwrapped face view of the contoured hydrostatic bearing surfaces 35a', 34a', 33a', 32a', 31a', 30a', and 29a' on one side of the carriage 2'. FIG. 13 shows an unwrapped face view of the contoured hydrostatic bearing surfaces 35b', 34b', 33b', 32b', 31b', 30b', and 29b' on the other side of carriage 2'. As shown in FIG. 11, FIG. 12, and FIG. 13, the pump 100' supplies fluid which passes through fluid resistances 51, 53, 54, and 56, then through bearing pocket holes 61, 63, 64, and 66, respectively, to bearing pocket grooves 231a', 233a', 233b', and 231b', respectively, located on the carriage 2' that rides on the rail 1'. The bearing pocket grooves typically have a depth equal to at least 10 times the nominal bearing gap, to minimize pressure drops across them. The actual location of the flow resistances can of course be optimized according to the type of restriction device used. It should be observed that inside the outer perimeter of the bearing pocket grooves 231a', 233a', 231b', and 233b' there are central damping lands 131a', 133a', 131b', 133b', respectively, which are precision surfaces coplanar with the neighboring bearing lands on surfaces 31a', 33a', 31b', 33b', respectively, to provide additional squeeze film damping to the bearing carriage.

In a manner similar to the self-compensating system described previously, considering for example side "a", the bearing pocket grooves 231a' and 233a' will not experience substantial "cross-talk" between them because the central surface 32a' is sufficiently wide to act as a region of high resistance relative to the resistance of the perimeter surfaces 29a', 30a', 34a', and 35a'. The present invention thus provides for substantially reduced flow and pump power requirements while at the same time only marginally effecting the load capacity and stiffness of the bearing, as can be determined by standard resistance circuit analysis known to those skilled in the art. The present invention also provides for a means to economically to manufacture modular hydrostatic bearings with small clearances required for efficient operation.

For some fixed compensating embodiments, it may be advantageous to have partial central drain grooves present over some of the length, but not all of the length, of form fitting central surfaces 32a' and 32b'. FIG. 14 and FIG. 15 show unwrapped face views of the contoured hydrostatic bearing surfaces of the carriage 2', with partial drain grooves 80a' and 80b' included, which are present over some of the length of surfaces 32a' and 32b'. Unlike prior art designs, for which central drain grooves extend the entire length of the carriage, the length of the partial central drain groove of the present invention is a design variable, which may be used for optimization of a desired bearing characteristic, such as load capacity or pump power. As with some self-compensating systems, one reason for having partial central drainage is that for some designs the rail may elastically deflect significantly, causing the gaps at the perimeter regions 34a', 35a', 34b', and 35b' to open up significantly, thereby reducing the pressure compensating effect. The adverse effects of rail deflection can be mitigated somewhat by means of partial central drain grooves 80a' and 80b', by allowing pressure compensation to occur along the centrally facing edges of the bearing pocket grooves, where less rail deflection occurs.

In addition to configuring the bearing surfaces in a back-to-back arrangement, it is possible to configure the bearing surfaces in a face-to-face arrangement. FIG. 16 shows a face-to-face embodiment of the present invention (as would be recognized by those familiar with the art), with arrows showing the direction of hydrostatic loading acting on the carriage, where rail 1c again includes mounting bolt holes such as 11c, and carriage 2c rides on the rail 1c in a close form-fitting manner to minimize leakage flows, as described in detail in previous paragraphs. The carriage 2c again includes threaded holes such as 10c for mounting. The hydrostatic loads on bearing surfaces 116a and 116b resist downward forces acting on the carriage 2c, and the hydrostatic loads on bearing surfaces 117a and 117b resist upward forces acting on the carriage 2c.

There may be some cases where a multi-tiered embodiment of the present invention is desirable, in order to achieve greater load carrying area and hence greater bearing load capacity, without increasing the overall envelope of the bearing size. A multi-tiered embodiment of the present invention, which includes six load bearing planar surfaces, is shown in FIG. 17, with arrows showing the direction of hydrostatic loading acting on the carriage. The embodiment includes rail 1d with bolt holes for attachment 11d and form-fitting carriage 2d to reduce flow, with threaded holes 10d for attachment. For the FIG. 17 embodiment, note that a force pushing down on the carriage is counteracted by hydrostatic loads acting on the four surfaces 110a, 112a and 110b, 112b, and a force pulling up on the carriage is counteracted by hydrostatic loads acting on the two surfaces 111a and 111b. FIG. 18 shows another multi-tiered embodiment which includes rail 1e with bolt holes for attachment 11e and form fitting carriage 2e for reducing flow, with threaded holes 10e for attachment. For the FIG. 18 embodiment, note that a force pushing down on the carriage is counteracted by hydrostatic loads acting on the two surfaces 114a and 114b, and a force pulling up on the carriage is counteracted by hydrostatic loads acting on the four surfaces 113a, 115a and 113b, 115b.

In all cases, the "a" side surfaces resist lateral loads in one direction, and the "b" side forces resist lateral loads in the other direction. The lines with arrows pointing to the carriage surfaces indicate the direction of hydrostatic loading acting on the carriage.

Figure 19:
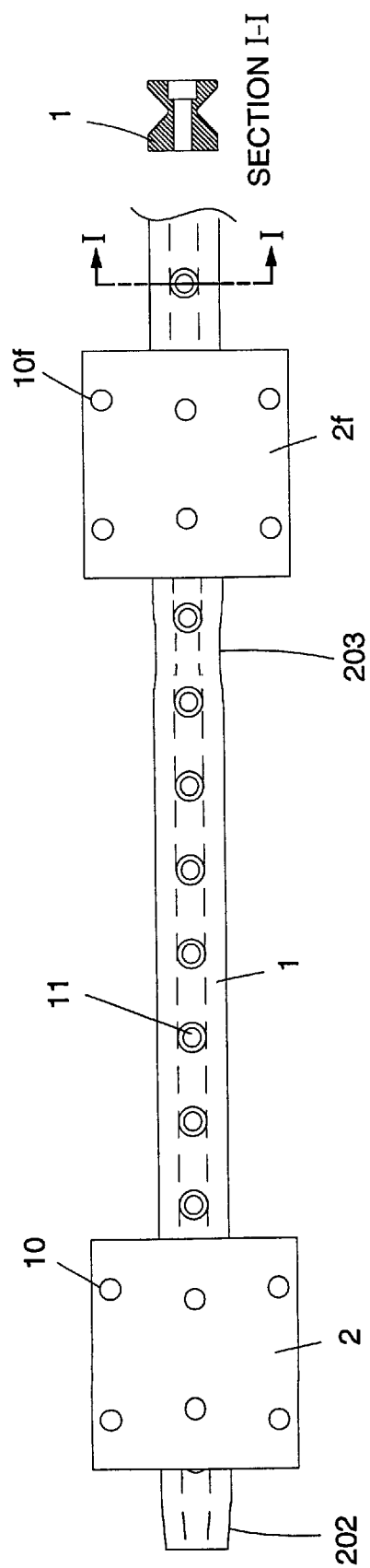
FIG. 19 is a top view of two carriages on a rail which has a taper and a neck to allow dirt particles trapped in any bearing pockets to be flushed away.

For cases where fine particle filtration is difficult, a cleaning means is provided for flushing away dirt particles which may accumulate in a bearing pocket, without causing a total loss of hydrostatic load carrying capacity. The cleaning means is achieved by grinding a local taper or neck in the rail, with a maximum depth roughly equal to the bearing gap, so that when a carriage is moved over the taper or neck, the bearing gap is roughly doubled over a portion of the carriage's length, allowing particles trapped in pockets which overlap the taper or neck to escape. Because grinding a slight taper or neck in a rail is a simple and low cost operation when using profile grinding techniques, the presently described cleaning means is well suited for use with the present form fitting carriage invention. To implement this cleaning means, the hydrostatic machine tool axis would be designed with some extra travel at one or both ends of its travel, where cleaning would occur. FIG. 19 shows an embodiment of the cleaning means, showing rail 1 with mounting holes such as 11, with taper 202 on its end, and neck 203 on its middle section, the latter two features being drawn greatly exaggerated for illustrative purposes. When carriage 2 is moved over taper 202, dirt trapped in pockets which overlap the taper 202 can be flushed away. Likewise, when carriage 2f is moved over the neck 203, dirt trapped in pockets which overlap the neck 203 can be flushed away. Using this method, self-compensating carriages would be oriented so the supply grooves face the taper or the neck to be used, so the supply grooves get flushed out first. For some applications, the carriages on the machine table will be separated enough so that cleaning can occur on all carriages at only one end of the table's travel, by using tapers at one end of the rails and necks in the middle. For the remaining applications, necks could not be used due to undesired overlapping, and hence tapers would have to be used at both rail ends, requiring the table to travel to either end of its travel to clean all of the carriages.

Figure 20:
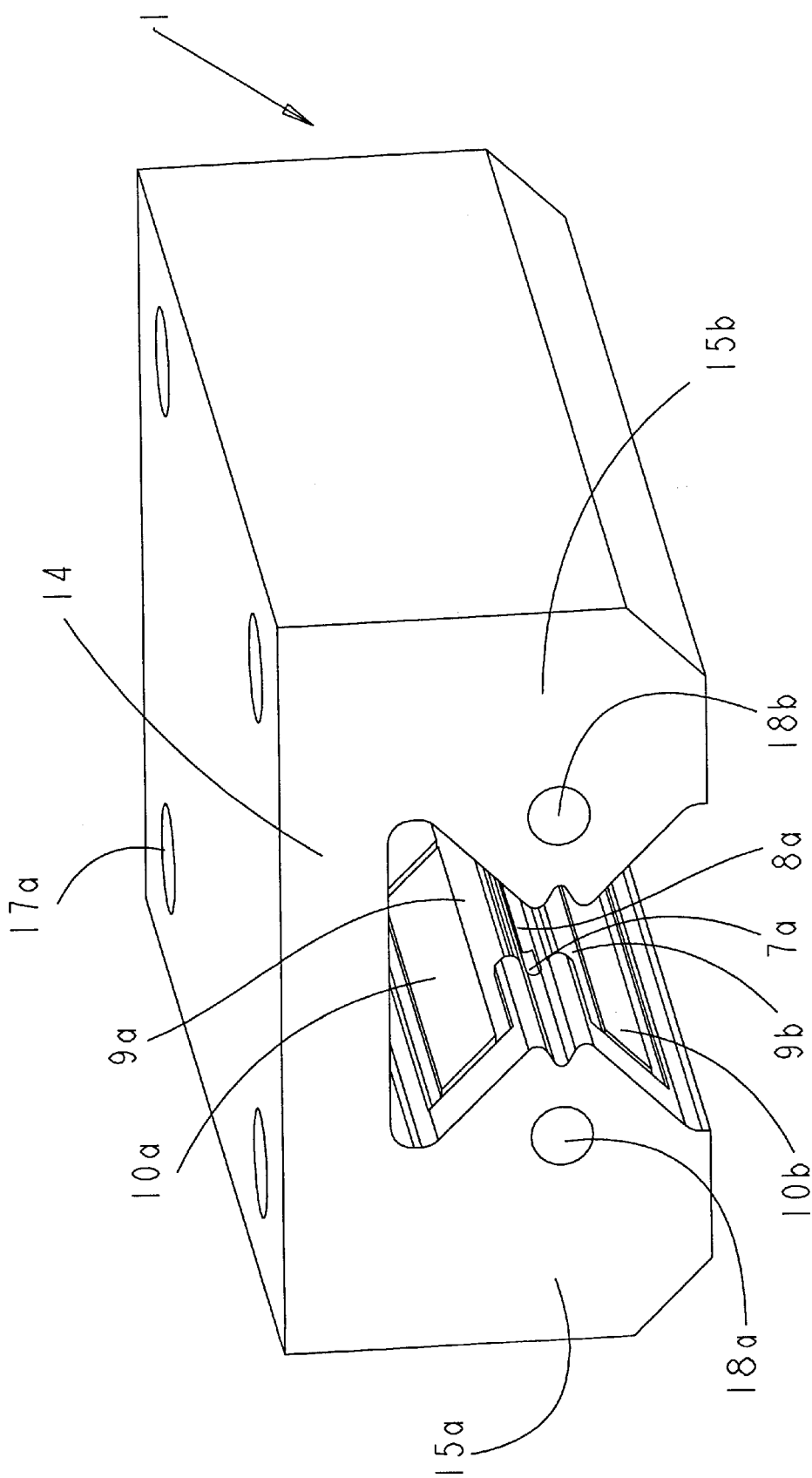
FIG. 20 shows an isometric view of the surface self compensated hydrostatic bearing carriage.

Turning, now, to the before mentioned improvement on the original invention of the parent application, also incorporated herein, whereby surface profile self-compensation is achieved that obviates the need for special tubing or manifold connections, FIG. 20 shows an isometric of the bearing carriage 1. FIG. 29 shows four such carriages 140a, 140c, and 140b, 140d on bearing rails 141a and 141b. The four carriages would support a load such as a machine table and be held to it by bolts in holes such as 17a in FIG. 20. Fluid from the pump 131 is delivered to the carriages by hoses 132 and 133. Other unique self-cleaning features associated with the fluid circuit will be discussed later. FIG. 20 shows the unique design of the carriage 1, which has an upper bridge structure 14 and side structures 15a and 15b. These structures must be sufficiently rigid to avoid bowing under hydrostatic pressure, which would decrease performance, and their design is known to those skilled in the art. The pressure supply fluid enters the carriage through supply holes 18a and 18b. Note the carriage is symmetrical. The pressure supply fluid can pass through the carriage to the next carriage, as shown in FIG. 29, and it also flows to the bearing surface via passage 8a. Fluid from passage 8a fills the pressure supply groove 7a, which thus acts as a pressure source groove that runs along the carriage's longitudinal axis direction. The fluid will be restricted in its flow to bearing pocket grooves 9a and 9b, which surround damping lands 10a and 10b.

Figure 21:
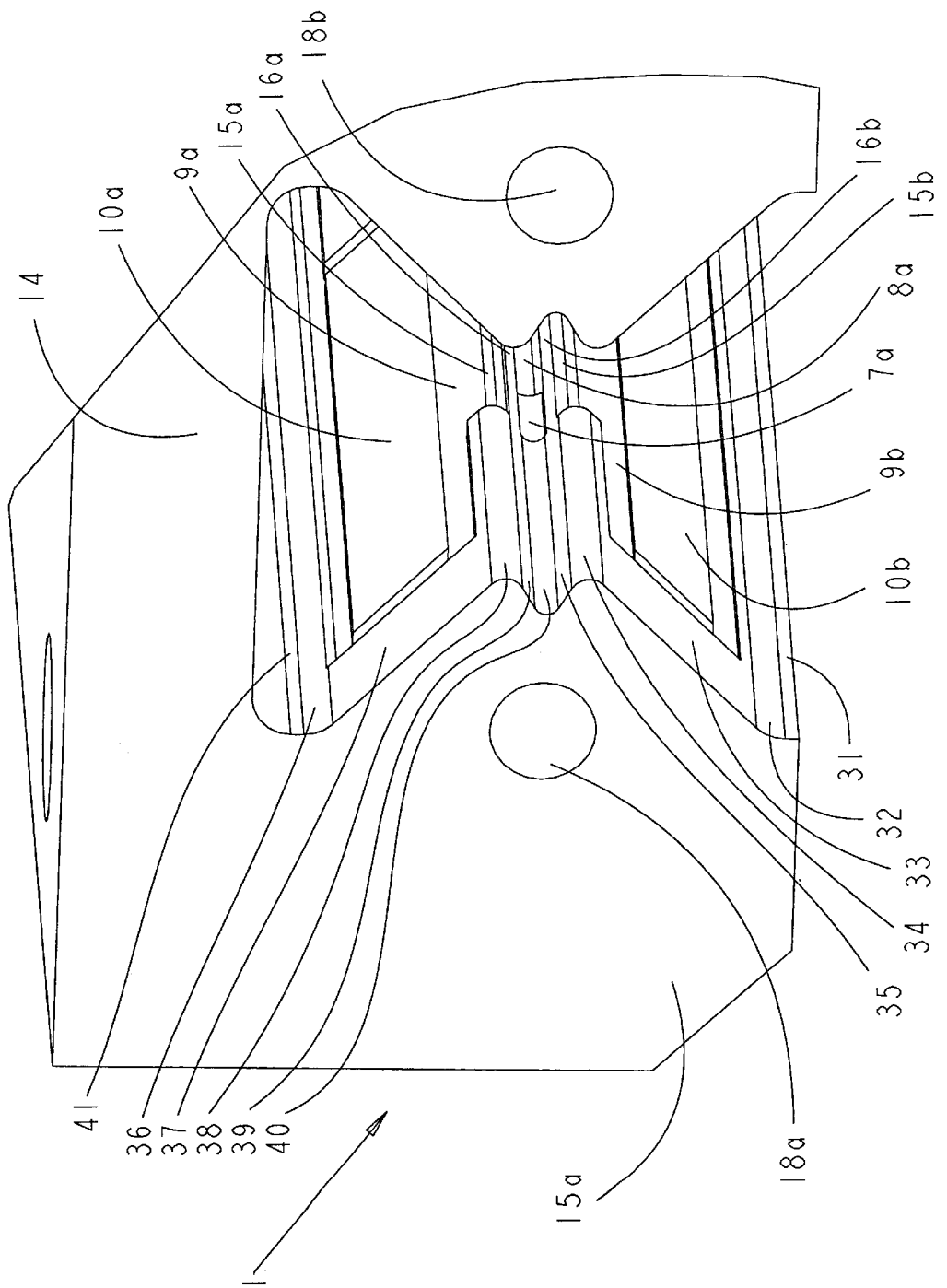
FIG. 21 is a close up isometric partial view of the carriage.
Figure 22:
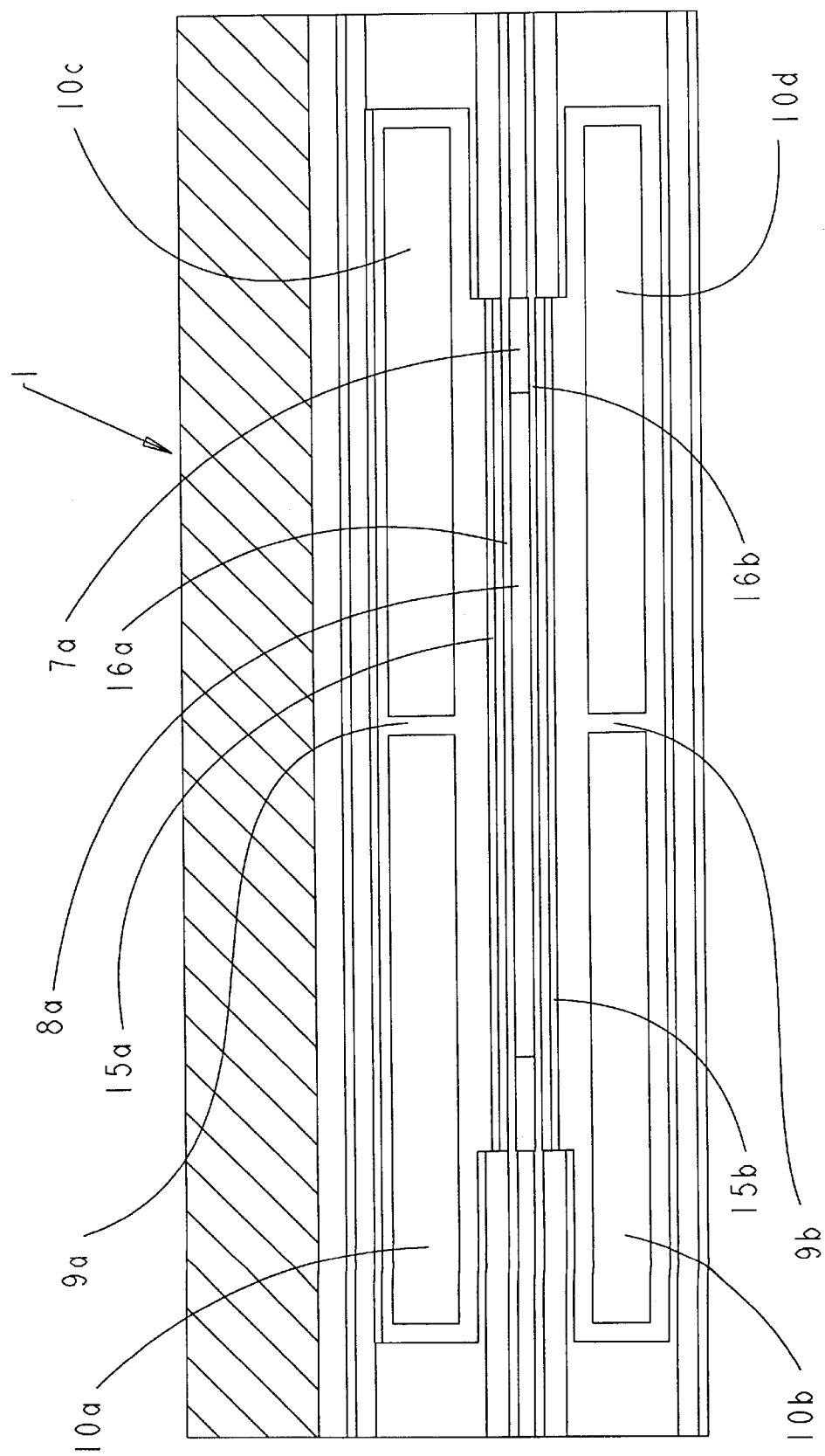
FIG. 22 is a side cross section view of the carriage.

FIG. 21 shows a close-up isometric of the features that enable the compensation to occur on the surface of the bearing, and FIG. 22 shows a cross section of the bearing. The pressure supply fluid flows through hole 18a and into the bearing region by passage 8a. It fills pressure supply groove 7a. Land region 40, concavely shaped, acts as a seal, although it can have a bearing gap larger than the nominal gap to allow any contamination particles to flow out of the bearing. The fluid in the pressure supply groove 7a wants to flow across compensator lands 16a and 16b to bearing pocket entrance regions 15a and 15b respectively, and then into bearing pocket grooves 9a and 9b respectively. Once in the bearing pocket grooves, the fluid wants to flow out of the bearing pockets, but is restricted by bearing pocket lands 36, 37, and 41 on the upper pocket and bearing pocket lands 31, 32, and 33 on the lower pocket. Bearing lands 38 and 39 convexly shaped on the upper pocket and 34 and 35 on the lower pocket act as sealing lands (resistors) to isolate the pockets from each other. Thus lands such as 36, 37, 41 and 31, 32, 33 act as the variable output resistors on the hydrostatic Wheatstone bridge circuit. The input resistors that provide compensation are the lands 16a and 16b which can function because they are inclined at a different angle than are the output lands associated with the bearing pockets. Because of their different angular orientations (slopes), when a load is applied to the carriage from any direction, the rate of change of bearing gap closure of the compensation lands 16a and 16b, will be very different than the rate of change of closure of the bearing output lands 36, 37, 41 and 31, 32, 33. Furthermore, because fluid flow resistance varies as the cube of the bearing gap, the flow resistance will vary rapidly, and highly effective compensation can be realized. And because all this takes place on the surface of the bearing, with no manifolding required to cross link compensator to bearing pad, the cost to manufacture is much lower than even that of a conventional self compensated bearing.

In order for this method to work, the carriage 1 must have a carefully matched rail with which it operates. The rail design is shown in FIGS. 23 and 24. The rail 2 would be bolted to machine components through holes such as 50a, 50b, 50c, and 50d. The base region 142 would have reference edges 141a and 141b that could be used to reference the rail with respect to an edge on a machine component. The rail 2 profile features 135, 136, 137, 138, 139, 140, 135, 134, 133, 132, and 131 correspond to the mating carriage 1 features 41, 36, 37, 38, 39, 40, 35, 34, 33, 32, and 31. The gap between the corresponding carriage and rail features is the nominal bearing gap, and for fluids it may typically be on the order of 10–50 microns, depending on the fluid viscosity and the type of machine. The load performance of the bearing is insensitive to the bearing gap, as opposed to conventional hydrostatic systems, which are extremely sensitive to the bearing gap variations. The compliance of the bearing varies nearly linearly with the bearing gap, and the fluid flow varies with the gap cubed.

Because carriage compensation lands 16a and 16b, and their rail counterparts 135 and 139, are at a different orientation angle than the output flow lands 41, 36, 37, 34, 32, and 31, when a force is applied to the carriage 1, the rate of gap change is different between these surfaces and their corresponding rail surfaces, so that the fluid resistance circuit will be self balancing and self compensating. To form these surfaces with a precision on the microns level, profile grinding with CNC created wheels can be used for the rails, and wire EDM or precision broaching can be used for the carriages.

Consider a downward force on a carriage. This causes bearing gap at land 36 to open partially, but it causes bearing gap at land 37 to open more rapidly, the product of the rate of downward displacement of the carriage and the sine of the land inclination angle from the vertical. As a result, the resistance to flow from the pocket 9a to the atmosphere drops and hence the pocket pressure drops. The pocket pressure minimally resists the flow in forcing the carriage downward. The compensation surface 16a, on the other hand, is at a very large angle with respect to the vertical, and it opposes the land 37, so it rapidly closes with downward motion, further choking the flow across compensation land 16a into pocket 9a, reducing the pocket pressure even further.

For the lower bearing pocket 9b, on the other hand, greater pressure must be generated to resists the downward force on the carriage. Downward motion of the carriage causes the gaps at the lands adjacent to pocket 9b to close at a rate opposite to the opening gaps for pocket 9a. Similarly, the gap between the compensation land 16b and the rail surface 135 opens sending a surge of pressure into the bearing pocket 9b. Thus the downward load on the carriage is supported by hydrostatic pressure.

For lateral loads normal to the structure 15a, both pockets 9a and 9b and their corresponding land regions are driven against the rail, causing an increase in pocket pressure as the gaps close. The compensator gaps, being at only a slight angle with respect to the direction of the force, close at a much slower rate, and still provide adequate flow to the bearing pockets. On the opposite side of the carriage, the pocket gaps open, the compensator gaps just essentially shear, change slightly, and the pressure in the pockets drops. Once again, the load on the carriage, this time lateral, is supported by hydrostatic pressure.

For very high speed operation, it can be desirable to provide for an auxiliary supply groove in front of the bearing pocket to act as a hydraulic dam to prevent air from being drawn into the pockets which would reduce stiffness. FIG. 25 shows the carriage 1 with the bearing pockets 9a and 9b and damping lands 10a and 10b and supply slot 8a and supply groove 7a which are supplied by input ports such as 18a and 18b on the opposed sides of the bearing. In this configuration, the output flow land for the pocket 9a is land 71a which borders supply channel 70a. The fluid in channel 70a would come at a lower pressure from supply ports 19a, and 19b on the opposite sides of the bearing. Primarily lands 36 and 32 would govern bearing pockets' exit flows, which govern the dynamics of the hydrostatic resistance circuit.

Figure 27:
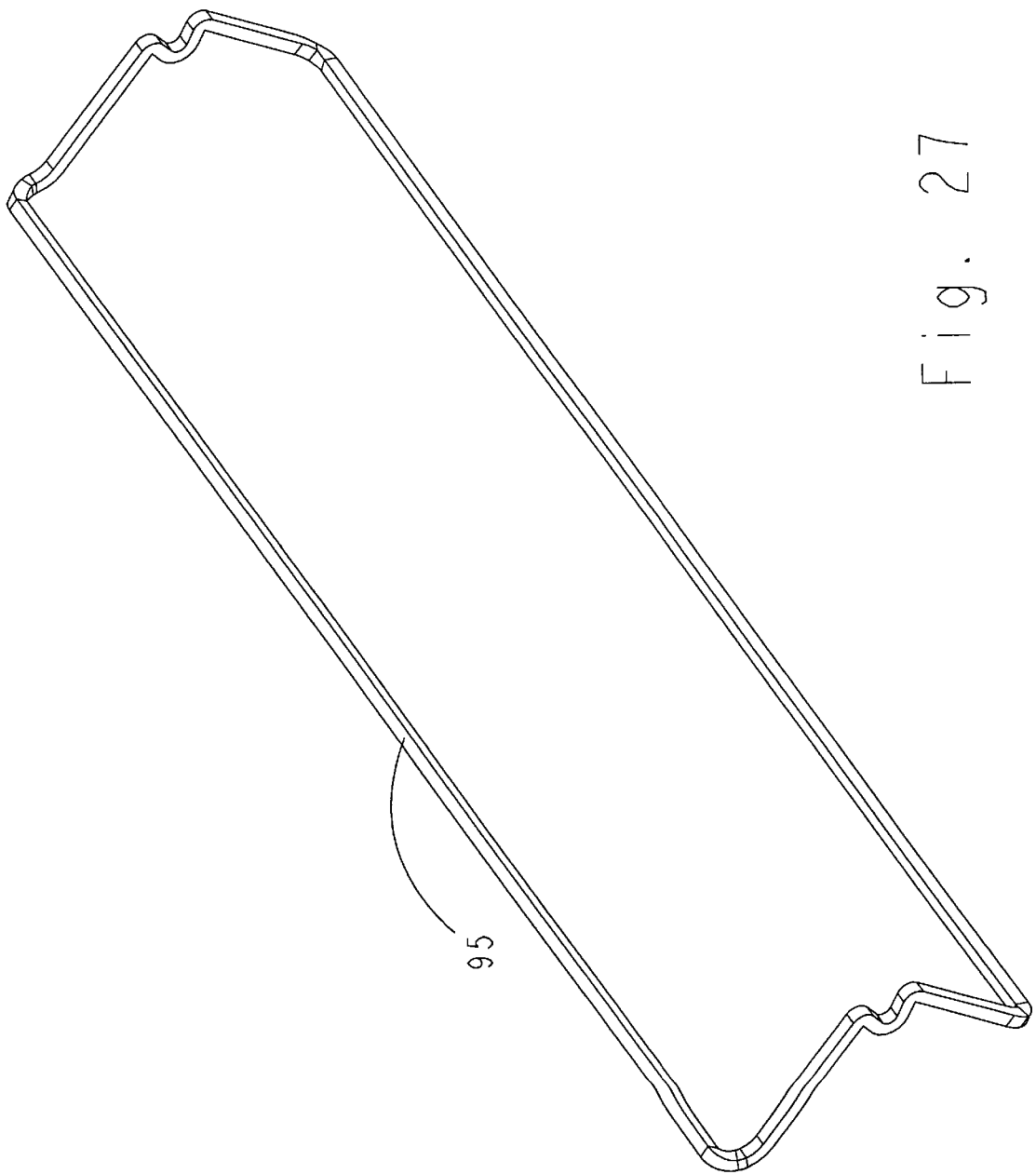
FIG. 27 is an isometric view of one of a pair of specially formed seals for the carriage.

In some cases it may be desirable to collect as much of the leakage flow as possible, and because this design has such low leakage flow from the pressure supply groove, a collection system can be included as shown in FIG. 26. Here the fluid from the pockets 9a and 9b flows to a collection groove 70a which is connected to port 19a by hole 92a. Ports 19a and 19b on the other side of the bearing can be connected to a suction pump to collect the fluid and return it to the fluid supply system. A seal would fit into the groove 90a that encircles the pockets 9a and 9b. A mirror image of this geometry exists on the opposite side of the carriage 1. The lands 36 and 32 no longer act as the primary pocket resistance lands, and instead the pocket's end lands 71a and 71b, and their compliments on the other end of the carriage, act as the primary output flow resistance lands. The lands 91a now will have minimal leakage flow. The pocket outflow land regions 31 and 41 also no longer affect the fluid resistance circuit because they are taken up by the seal region. The seal 95 is shown in FIG. 27, and it is molded to just fit in the geometry of the seal groove 90a.

When a highly compressible fluid, such as a gas, is applied to a conventional self compensated bearing, the volume of fluid between the compensation region and the bearing pocket region is relatively large, compared to the volume of gas in the bearing gap, and an unstable condition known as pneumatic hammer often occurs. However, as shown in FIG. 28, the compensation lands 239 and 235 are immediately adjacent to the bearing pocket regions 109a, 109b, 109c and 209a, 209b. The leakage lands are primarily 236 and 110a on the upper pockets, and 232 and 110b on the lower pockets. The depth, width, and spacing of the pocket regions along the length of the carriage 100 should yield a total pocket volume of about one twentieth of the total volume of air in the close gaps between the carriage and the rail.

With all of these designs, note on the rail 2 in FIG. 24, that the central compensation nub feature with surfaces 135, 140, and 139 protrudes into the carriage 1, such that the width of the nub is small and thus the leakage path from the pressure supply groove 7a to the atmosphere is very narrow and long. Thus one can afford to leave the gap between surfaces 140 and 40 larger than the gaps between the other bearing surfaces which directly affect the bearing's performance. This larger gap, narrow and long channel acts as a contamination exit conduit. It is also the region most likely to have greater manufacturing errors, so the parts can be toleranced to yield larger gaps and thus make the design more robust for manufacturing and operation in a potentially dirty environment. The use of a larger clearance between the rail 2 and the carriage 1 at the root interface where protrubance 140 mates with groove 40 suggests that the clearance can be larger than the normal compensation region clearance between surfaces 139 and 39 and 135 and 35. In fact, because the width of surface 140 is so narrow and the distance to the supply groove 7a is so long, the clearance can be several times the bearing or compensator gap with only a small penalty in leakage flow. However, because the gaps considered here are still on the order of tens of microns, they cannot be shown in greater detail than is shown in the drawings To further help ensure robust operation, even when the fluid supply may be contaminated, the connection-to-pressure-supply slot 8a can be the entire length of the supply groove 7a. This makes the slot long and deep, and orthogonal to the pressure flow in the supply line 18a in FIG. 20. Thus large particles pass by and have no place in which to become lodged. A variation on this theme is to have the supply hole 18a be drilled from each end of the carriage 1, but not connect in the middle. The pressure supply slot 18a connects the two ends of the hole, so fluid enters the pressure supply groove 7a at one end and leaves at the other end. To further provide contamination robustness, as shown schematically in FIG. 29, flow from the pump 131 travels to the set of bearings 140a, 140b, 140c, and 140d via main input line 132. Line 132 splits into two lines 132a and 132b. Line 132a feeds carriage 140a, similar to carriage 1 in FIG. 20 where fluid enters through supply port 18a, and the fluid passes through while supplying the carriage. The fluid passes via line 132c to the next carriage 140c, and excess flow flows out line 132e to join up with return line 133 to go back to the pump 131. Similarly, pressure in line 132b carriage 140b and flow continues through the line 132d to carriage 140d and excess flow goes through line 132f to join with return line 133. If the lines 132 are large, then there will be no appreciable pressure drop between the carriages. Design of pressure-drop-free fluid supply systems is well known to those skilled in the art of hydraulic fluid supply systems.

Previously, hydrostatic systems just have a supply line into the bearings, with no pressure return line. As a result, contamination particles reach the end of the line and start to build up. By allowing for the direct pass-through as shown in FIG. 29, particles pass through the system and return to the pump system 131 which always has a filter system/ settling tank. This enables the pump systems to be designed with multiple filters, for robustness, and in the event some particles do get through, as sometimes happens during filter changing, the system will pass them through. By configuring the pressure supply lines to essentially have a straight-through hole through the bearing block, as holes 18a and 18b do in carriage 1 in FIG. 20, momentum will carry particles straight through the bearings with a minimal likelihood that they will become lodged in the pressure supply groove to the pressure supply groove 7a for the bearing compensation regions.

In order to engineer the bearing dimensions, an engineer skilled in the art of fluid flow calculations can use the above described philosophy of operation to create a spreadsheet. An example of the type of spreadsheet that can be used to calculate bearing dimensions and operating characteristics is shown in FIG. 30. For modular bearing systems, little space is available, and hence it is important that the bearing be mathematically modeled and optimized to make the best use of the limited space. The bearing of the present invention has been modeled by computing the flow rate and pressure distribution of fluid as it passes through the various bearing land regions, using equations for laminar and fully developed flow between nearly parallel plates. These equations are known to one skilled in the art, and can be found for example in Slocum, A. H., *Precision Machine Design*, 1992, Prentice Hall, Englewood Cliffs N.J.

Analysis is performed by first dividing the land areas into simple planar rectangles, planar triangles, round regions, and then computing the fluid resistance and effective areas of the simple regions. The fluid resistances and effective areas of the simple regions are then combined using equations for lands in series or lands in parallel, to create a fluid circuit model of the entire bearing. Given the supply pressure and the displacement of the carriage, the fluid circuit model and the combined effective areas are then used to compute the fluid flow rate, the pressure in each of the four bearing pockets, and the net force acting on the bearing carriage. Using the flow rate, the pumping power is readily computed by multiplying the flow by the supply pressure. Using the net force on the carriage given the carriage displacement, the carriage load capacity and stiffness are readily computed. Other important bearing parameters, such as dynamic friction and temperature rise of the fluid are readily computed by those skilled in the art of hydrostatic bearing design. Using a supply pressure, an initial bearing gap, fluid properties, and a sample set of input dimensions for a bearing carriage of the present invention, several bearing performance parameters have been computed using the spreadsheet model for the present invention, as shown in FIG. 30. Given an overall size of the bearing carriage, several internal land dimensions can be varied to optimize the bearing performance. Some important optimization variables are the restrictor, 16a and 16b, dimensions (width and length), and the dimensions of the long land regions, 36 and 32 parallel to the carriage motion. A common optimization goal, which is useful for general machining centers and grinders, is to maximize the average of the vertical and horizontal load capacity of the carriage, given a set pump power. Another possible optimization goal, which is useful for high precision, low force applications such as jig grinding, is to maximize the stiffness of the carriage at some nominal operating load.

Further modifications of the invention will also occur to persons skilled in the art, and all such are deemed to fall within the spirit and scope of the invention as defined in the appended claims.

What is claimed is:

1. A modular hydrostatic bearing for use in precision machine tools, having, in combination, a modular bearing carriage for supporting a structure on, precision profiled bearing rails bolted to a machine bed; a fluid pressure source and fluid distribution system therefrom, keeping the carriage from making physical contact with the bearing rails; hydrostatic bearing pockets formed in the carriage, said bearing rail having two sides and two or more surfaces per side that form load-carrying surfaces that the hydrostatic bearing pockets run against, and which have precision smooth continuous curves only between them, such that the carriage can be formed with a mating surface containing the hydrostatic bearing pockets and also have smooth continuous surfaces between the hydrostatic bearing pockets, enabling the carriage to be fitted over the rail with clearance suitable for hydrostatic bearing operation, but greatly reduced leakage flow because there is limited direct leakage flow to the atmosphere from between sets of adjacent load carrying hydrostatic bearing pockets.

2. A modular hydrostatic bearing as claimed in claim 1 wherein said carriage is formed by 3D solid printing so that all hydrostatic pockets and internal passages are formed by the 3D printing process, and the bearing surfaces need only be cleaned up to form precise surfaces using one of broaching, wire electrical discharge machining, grinding, or other similar precision manufacturing methods.

3. A modular hydrostatic bearing for use in precision machine tools, having, in combination, a modular bearing carriage for supporting a structure on, precision profiled bearing rails bolted to a machine bed; a fluid pressure source and fluid distribution system therefrom, keeping the carriage from making physical contact with the bearing rails; hydrostatic bearing pockets formed in the carriage, said bearing rail having two sides and two or more surfaces per side that form load-carrying surfaces that the hydrostatic bearing pockets run against, and which have precision smooth continuous curves only between them, such that the carriage can be formed with a mating surface containing the hydrostatic bearing pockets, and also have smooth continuous surfaces between the hydrostatic bearing pockets enabling the carriage to be fitted over the rail with clearance suitable for hydrostatic bearing operation, but greatly reduced leakage flow because there is limited direct leakage flow to the atmosphere from between sets of adjacent load carrying hydrostatic bearing pockets, wherein hydrostatic compensation means is provided by one of an orifice, a flow restrictor, a diaphragm, a constant flow device, a laminar flow device, and a porous medium and wherein the bearing pocket volumes are kept to a minimum so as to enable the operation of the system with a highly compressible fluid, such as air or a cryogenic fluid.

4. A modular hydrostatic bearing for use in precision machine tools, having, in combination, a modular bearing carriage for supporting a structure on, precision profiled bearing rails bolted to a machine bed; a fluid pressure source and fluid distribution system therefrom, keeping the carriage from making physical contact with the bearing rails hydrostatic bearing pockets formed in the carriage, said bearing rail having two sides and two or more surfaces per side that form load-carrying surfaces that the hydrostatics bearing pockets run against, and which have precision smooth continuous curves only between them, such that the carriage can be formed with a mating surface containing the hydrostatic bearing pockets, and also have smooth continuous surfaces between the hydrostatic bearing pockets, enabling the carriage to be fitted over the rail with clearance suitable for hydrostatic bearing operation, but greatly reduced leakage flow because there is limited direct leakage flow to the atmosphere from between sets of adjacent load carrying hydrostatic bearing pockets, wherein hydrostatic compensation means is provided by one of an orifice, a flow restrictor, a diaphragm, a constant flow device, a laminar flow device, and a porous medium and wherein the fluid supply to the compensating paths is connected along its length and orthogonal to a main supply line to prevent the entrapment of contamination particles in the surface.

5. A hydrostatic bearing system, having separated fluid pressure supply grooves and bearing pocket regions in the vicinity of the pressure supply grooves, formed along the bearing surface, supported with a rail, and wherein the bearing pocket regions are inclined at a different angle along the surface than the region that separates them from the pressure supply grooves, such that the rate of change of gap closure towards the rail under load in the pocket region is different than the rate of change of gap closure in the region that separates the pocket regions from the pressure supply groove regions, wherein the entire bearing region is surrounded by a sealing groove region and seal and drain pockets are provided, contained within a sealing region.

6. A hydrostatic bearing system, having separated fluid pressure supply grooves and bearing pocket regions in the vicinity of the pressure supply grooves, formed along the bearing surface, supported with a rail, and wherein the bearing pocket regions are inclined at a different angle along the surface than the region that separates them from the pressure supply grooves, such that the rate of change of gap closure towards the rail under load in the pocket region is different than the rate of change of gap closure in the region that separates the pocket regions from the pressure supply groove regions, wherein the carriages have fluid supply ports that pass entirely through them, so particles tend to pass through, and the fluid supply to the compensating paths is connected along its length and orthogonal to the supply line to prevent the entrapment of contamination particles in the surface.

7. A hydrostatic bearing system, having separated fluid pressure supply grooves and bearing pocket regions in the vicinity of the pressure supply grooves, formed along the bearing surface, supported with a rail, and wherein the bearing pocket regions are inclined at a different angle along the surface than the region that separates them from the pressure supply grooves, such that the rate of change of gap closure towards the rail under load in the pocket region is different than the rate of change of gap closure in the region that separates the pocket regions from the pressure supply groove regions, wherein the carriages have fluid supply ports that are drilled from each end of the carriage, but not connected in the middle, and slots at the ends of the pressure supply groove that connect the ends of the groove with the fluid supply ports.

8. A hydrostatic bearing system, having separated fluid pressure supply grooves and bearing pocket regions in the vicinity of the pressure supply grooves, formed along the bearing surface, supported with a rail, and wherein the bearing pocket regions are inclined at a different angle along the surface than the region that separates them from the pressure supply grooves, such that the rate of change of gap closure towards the rail under load in the pocket region is different than the rate of change of gap closure in the region that separates the pocket regions from the pressure supply groove regions, wherein the gap between the carriage and the rail in the axial region between the end of the pressure supply groove and the end of the carriage is larger than the bearing gap to enable particles to pass through the system without becoming trapped.

9. A modular hydrostatic bearing for use in precision machine tools having, in combination, a modular bearing carriage wherein the bearing surface is provided with hydrostatic bearing pockets, fluid pressure supply grooves and drains therein, for supporting a structure on precision profiled bearing rails bolted to a machine structure, the rails cross section being of specially curved profile to create surfaces with which the carriage hydrostatic bearing pockets react to support a load, and in which the rails also have special contours that create surface self-compensating resistant paths directly between the pressure supply grooves and the load-bearing hydrostatic pockets, and in which special compensation contours are provided and oriented at an angle to the leakage paths from the hydrostatic pockets to the drains, thereby causing flow to the hydrostatic pockets inversely proportional in relation to the amount of bearing gap closure between the pockets and the rail, wherein the hydrostatic bearing surfaces contain adjacent bearing pockets that are connected by smooth continuously curved accurately formed profiled contours to allow corresponding contours on the hydrostatic bearing-supported carriage to mate with the rail such that there is no direct leakage path from between adjacent bearing pockets to the atmosphere, and wherein the continuously curved contours surfaces are a combination of multiple adjacent convex and concave surfaces.

10. The modular hydrostatic bearing as claimed in claim 9 wherein fluid from each bearing pocket flows over a convex surface and is channeled directly to a pocket on an adjacent concave surface.

11. The modular hydrostatic bearing as claimed in claim 10 wherein self-compensation of the bearing is achieved by lands and connecting flow paths provided on the surfaces of corresponding convex and concave surfaces.

* * * * *